(12) United States Patent
Robinson et al.

(10) Patent No.: US 12,270,204 B2
(45) Date of Patent: Apr. 8, 2025

(54) SCREENING ELEMENT, SCREEN ASSEMBLY AND MOUNTING SYSTEM

(71) Applicant: Valmont Australia PTY LTD, Victoria (AU)

(72) Inventors: Brent Mark Robinson, Victoria (AU); Damian Parker, Victoria (AU)

(73) Assignee: Valmont Australia PTY LTD, Victoria (AU)

( * ) Notice: Subject to any disclaimer, the term of this patent is extended or adjusted under 35 U.S.C. 154(b) by 327 days.

(21) Appl. No.: 17/638,698

(22) PCT Filed: Aug. 27, 2020

(86) PCT No.: PCT/AU2020/050898
§ 371 (c)(1),
(2) Date: Feb. 25, 2022

(87) PCT Pub. No.: WO2021/035302
PCT Pub. Date: Mar. 4, 2021

(65) Prior Publication Data
US 2022/0356711 A1    Nov. 10, 2022

(30) Foreign Application Priority Data
Aug. 27, 2019 (AU) .................. 2019903137

(51) Int. Cl.
*E06B 9/24* (2006.01)
*E04F 10/08* (2006.01)

(52) U.S. Cl.
CPC ............... *E04F 10/08* (2013.01); *E06B 9/24* (2013.01); *E06B 2009/2441* (2013.01); *E06B 2009/2452* (2013.01); *E06B 2009/2476* (2013.01)

(58) Field of Classification Search
CPC ...... E06B 7/08; E06B 7/082; E06B 2009/015; E06B 9/01; E06B 9/02; E06B 9/24;
(Continued)

(56) References Cited

U.S. PATENT DOCUMENTS 1,606,434 A    11/1926  McAfoos
1,634,843 A *   7/1927  McWane .................. E06B 9/01
                                                      49/56
(Continued)

FOREIGN PATENT DOCUMENTS

CN    204960177 U    1/2016
DE       9201338    6/1996
(Continued)

OTHER PUBLICATIONS

International Search Report issued on Nov. 16, 2020 in PCT/AU2020/050898.
(Continued)

*Primary Examiner* — Johnnie A. Shablack
(74) *Attorney, Agent, or Firm* — Barnes & Thornburg LLP

(57) ABSTRACT

Embodiments generally relate to a screening element, screen assembly, and associated fixing systems, components and methods. Such embodiments can be used for exterior protection of windows and/or building facades, particularly in commercial buildings and the like. Some embodiments relate to a lightweight screening element, awning or louvre blade that can be readily fixed and applied to the exterior of buildings or built structures so as to provide a screen. Some embodiments relate to a screening element, comprising: an elongate panel defining a first portion and a second portion angled relative to the first portion; and at least one solar panel connected to the first portion of the elongate panel.

20 Claims, 24 Drawing Sheets

(58) Field of Classification Search
CPC ..... E06B 2009/2441; E06B 2009/2452; E06B 2009/2476; E04F 10/08
See application file for complete search history.

(56) References Cited

U.S. PATENT DOCUMENTS

| | | | | |
|---|---|---|---|---|
| 2,680,886 | A * | 6/1954 | Urban | E06B 7/082 52/473 |
| 2,962,137 | A * | 11/1960 | Milavec | E06B 7/082 52/473 |
| 3,060,834 | A * | 10/1962 | Cira | F24F 13/08 454/282 |
| 3,224,048 | A * | 12/1965 | Sullivan | E06B 9/01 52/645 |
| 3,333,525 | A * | 8/1967 | Tischuk | E06B 7/082 454/281 |
| 3,438,167 | A * | 4/1969 | Royston, Jr. | E06B 7/082 52/473 |
| 3,580,160 | A * | 5/1971 | McCabe | F24F 13/08 454/282 |
| 3,730,074 | A * | 5/1973 | Helwig | E06B 7/082 454/309 |
| 4,050,366 | A | 9/1977 | Wiklund et al. | |
| 4,208,846 | A * | 6/1980 | Griebel | E04F 10/08 D25/57 |
| 4,358,910 | A * | 11/1982 | Keating | E06B 9/04 49/56 |
| 4,395,861 | A * | 8/1983 | Fipke | E04F 19/10 52/106 |
| 4,400,912 | A * | 8/1983 | Wicks, Sr. | E06B 9/01 49/56 |
| 4,441,299 | A * | 4/1984 | Gries | E06B 9/01 D25/48.8 |
| 4,459,975 | A * | 7/1984 | Hobart | E06B 9/28 126/569 |
| 4,603,996 | A * | 8/1986 | Chen | F16B 7/025 403/237 |
| 4,902,066 | A * | 2/1990 | Norman | B62D 35/001 296/180.1 |
| 4,938,154 | A * | 7/1990 | Watt | E06B 5/025 109/51 |
| 5,353,565 | A * | 10/1994 | Tanikawa | E06B 7/082 52/203 |
| 5,383,315 | A * | 1/1995 | Birs | E06B 9/02 52/509 |
| 5,458,428 | A * | 10/1995 | West | E04C 3/30 403/252 |
| 5,560,164 | A * | 10/1996 | Ahrens | E06B 9/02 52/745.15 |
| 5,826,393 | A * | 10/1998 | Wenzlaff | E06B 9/01 52/473 |
| 5,906,083 | A * | 5/1999 | Olsen | E06B 7/08 52/302.1 |
| 5,927,840 | A * | 7/1999 | Bzowski | E06B 7/28 211/88.01 |
| 6,036,176 | A * | 3/2000 | Rotshtain | E06B 9/02 256/65.12 |
| 6,886,294 | B1 * | 5/2005 | Carey | E06B 7/082 49/73.1 |
| 7,069,700 | B2 * | 7/2006 | Heissenberg | E06B 9/02 49/463 |
| 7,438,336 | B1 * | 10/2008 | Wolf | E05B 65/1033 49/141 |
| 7,464,506 | B2 * | 12/2008 | Atkinson | E06B 9/02 52/2.14 |
| 7,823,342 | B1 * | 11/2010 | Van Horn Steel | E06B 9/02 49/141 |
| 7,827,744 | B2 * | 11/2010 | Wenrick | E06B 9/02 52/202 |
| 8,001,735 | B2 * | 8/2011 | Fisher | E06B 9/02 52/584.1 |
| 8,082,706 | B2 * | 12/2011 | Myny | E06B 9/02 52/202 |
| 8,256,167 | B2 * | 9/2012 | Braybrook | E06B 7/082 52/75 |
| 8,950,129 | B2 * | 2/2015 | Motosko, II | E06B 9/02 52/203 |
| 9,028,162 | B1 * | 5/2015 | Lagassey | E04B 1/388 403/324 |
| 9,169,672 | B1 * | 10/2015 | Kislov | E06B 9/02 |
| 2004/0010972 | A1 | 1/2004 | Crozzoli | |
| 2008/0190065 | A1 * | 8/2008 | Craig | E04H 9/14 52/586.1 |
| 2009/0320388 | A1 | 12/2009 | Lilli | |
| 2011/0011009 | A1 | 1/2011 | Claerhout et al. | |
| 2011/0067329 | A1 * | 3/2011 | Myny | E06B 9/02 52/745.15 |

FOREIGN PATENT DOCUMENTS

| | | | |
|---|---|---|---|
| EP | 0120755 | 10/1984 | |
| WO | WO-2011127518 A1 * | 10/2011 | ............. E04F 10/08 |
| WO | 2011154787 | 12/2011 | |
| WO | WO-2012009743 A1 * | 1/2012 | ............. E04F 10/08 |
| WO | 2017086810 | 5/2017 | |

OTHER PUBLICATIONS

Written Opinion Report issued on Nov. 16, 2020 in PCT/AU2020/050898.

* cited by examiner

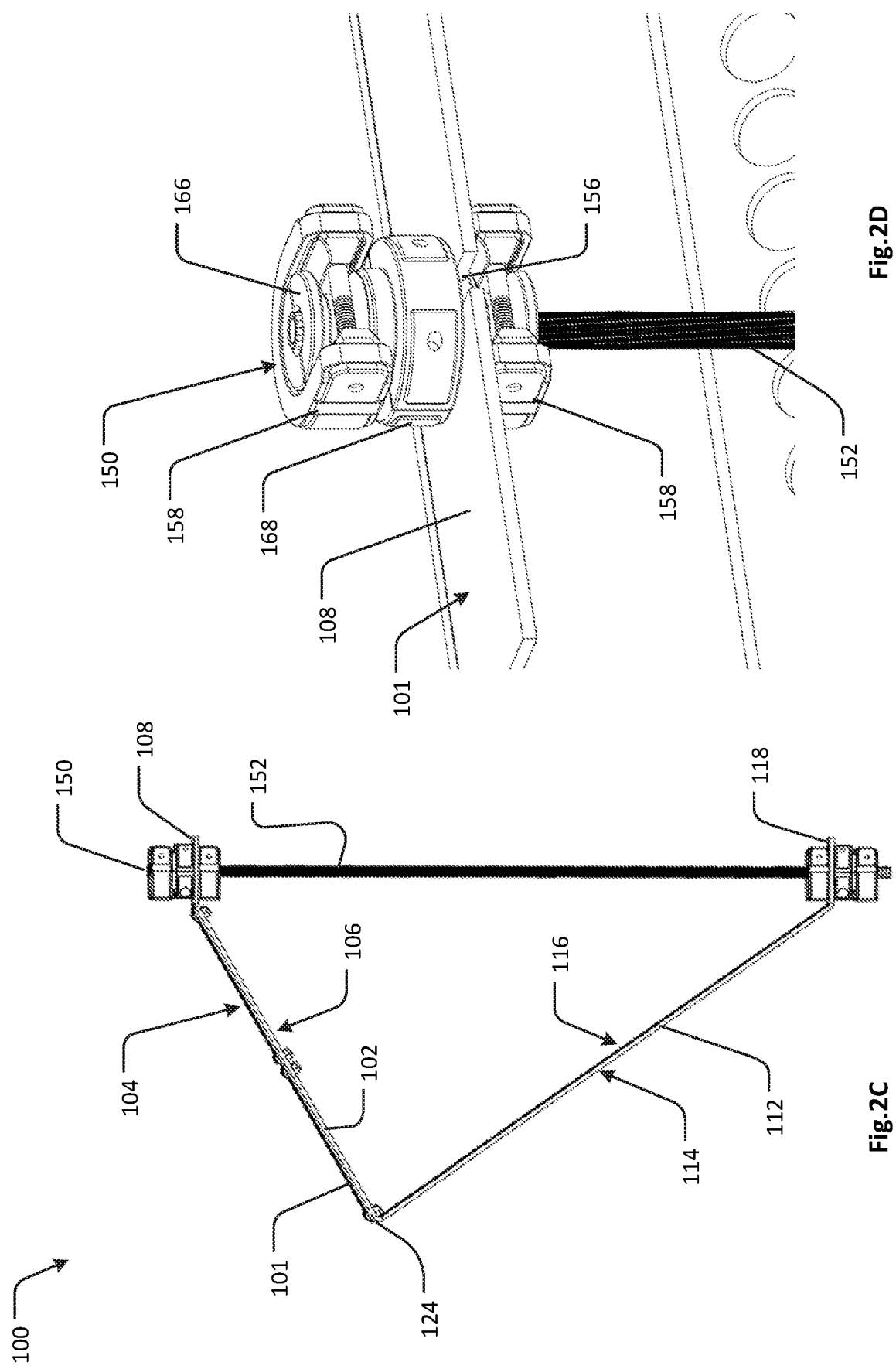

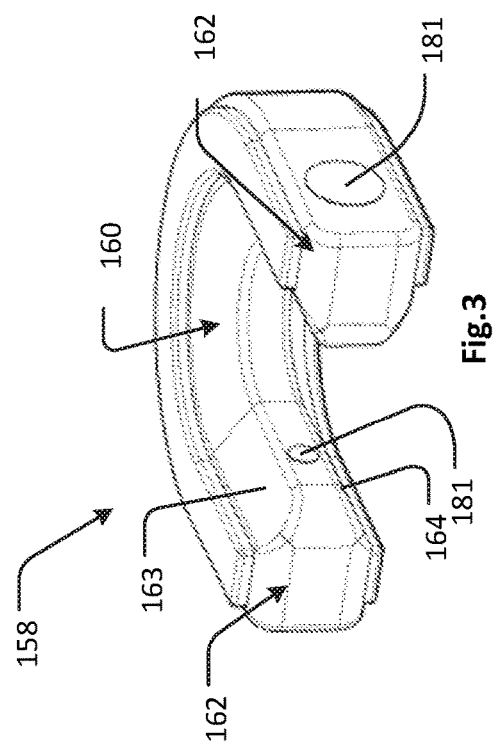
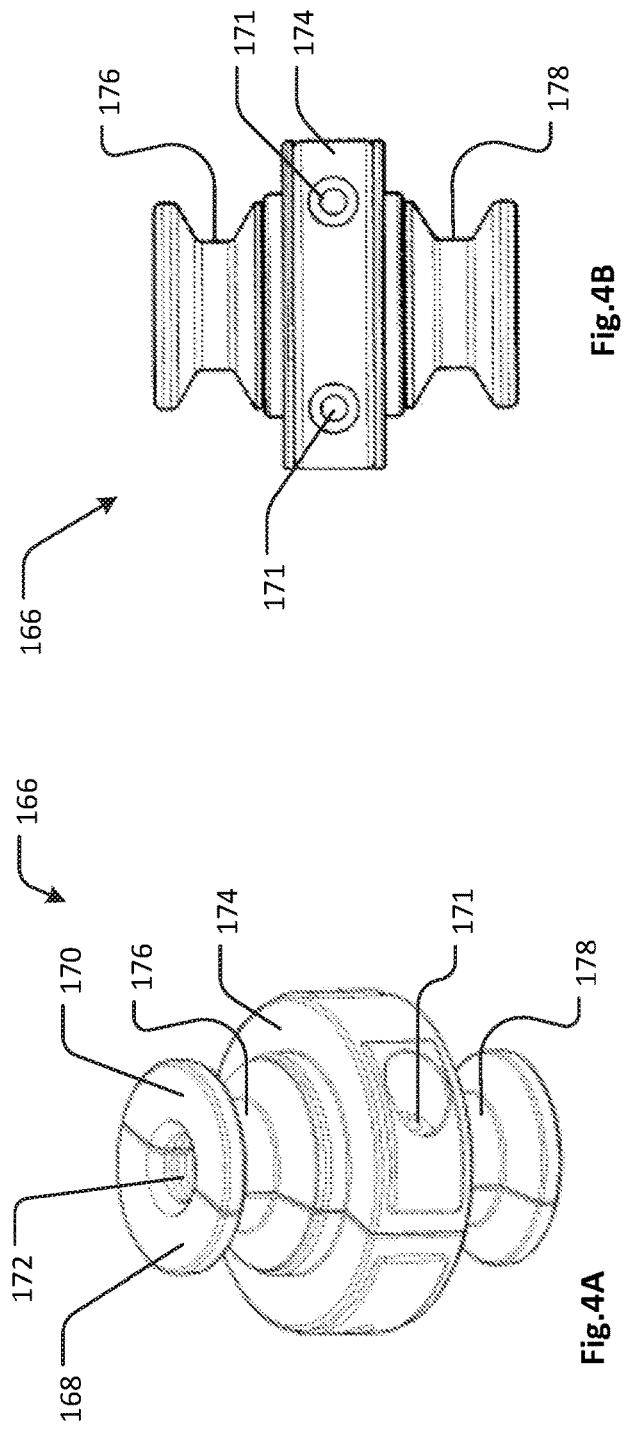

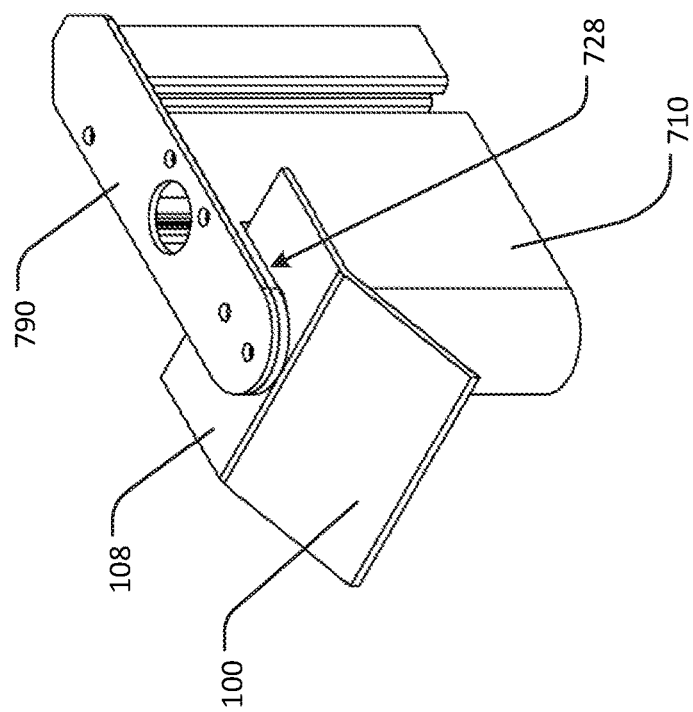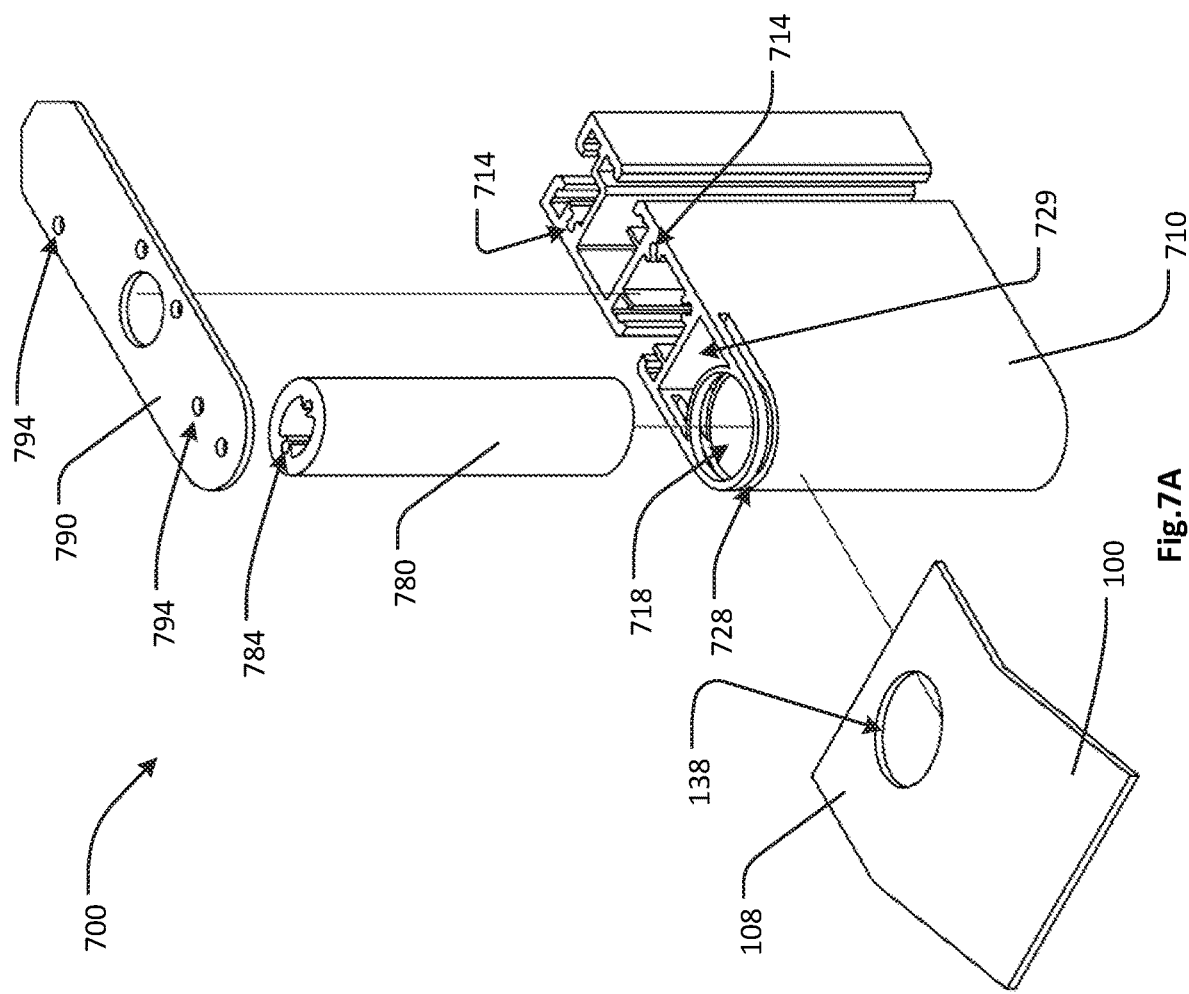

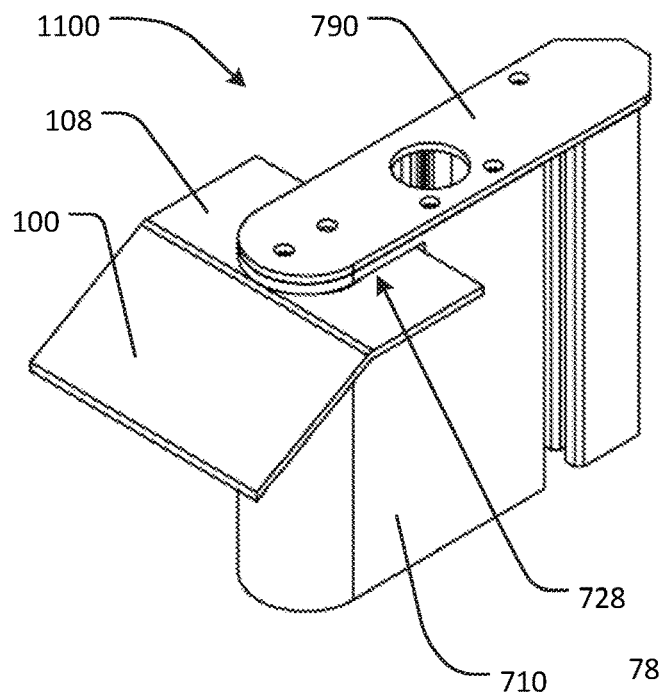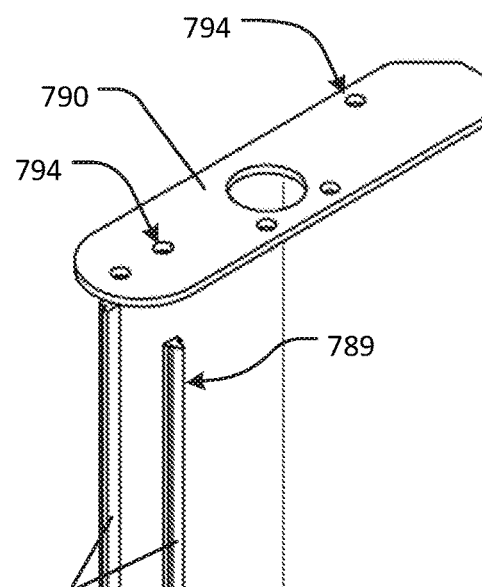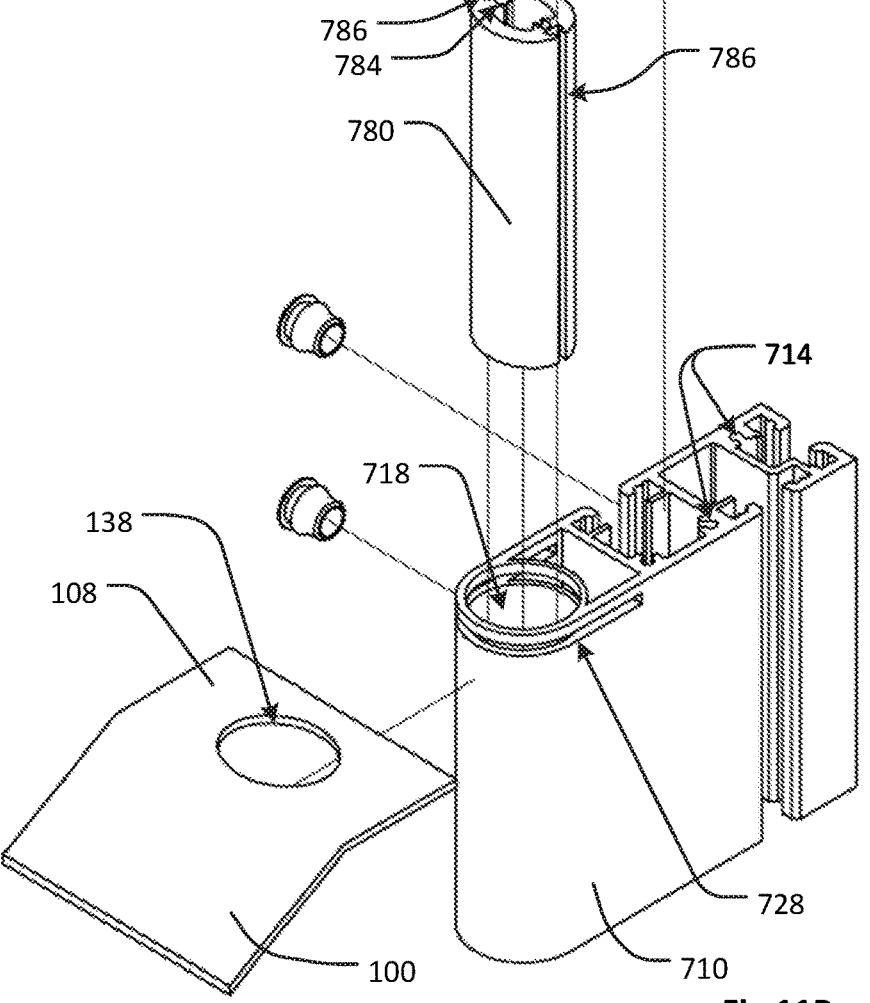
Fig.11A
Fig.11B

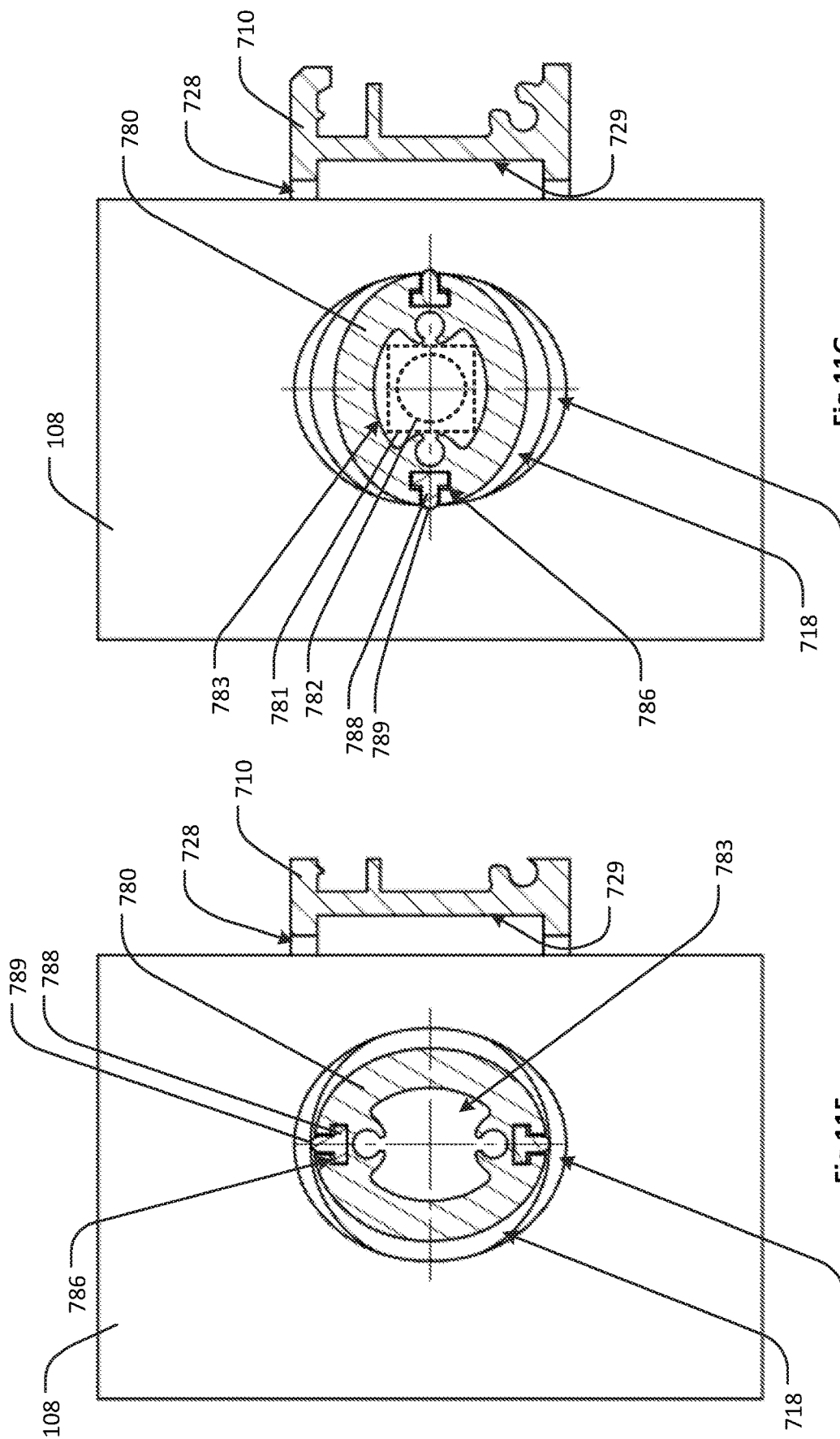

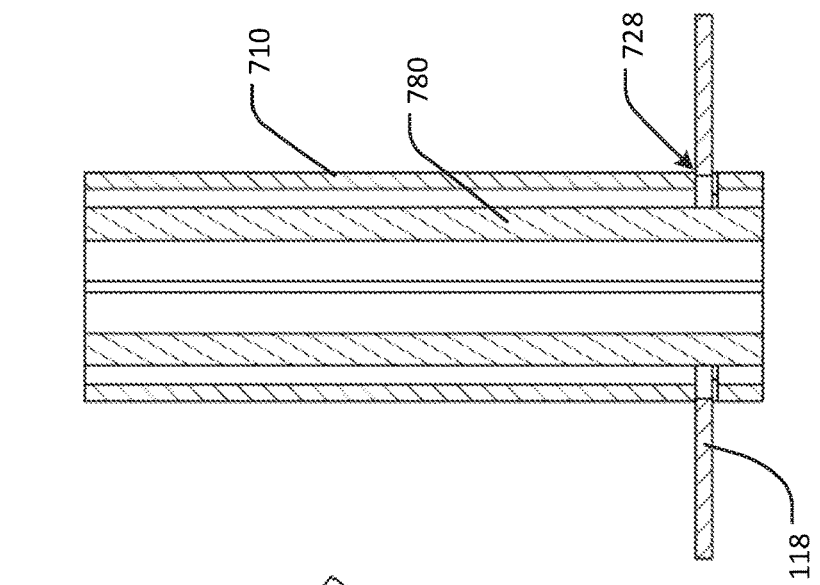
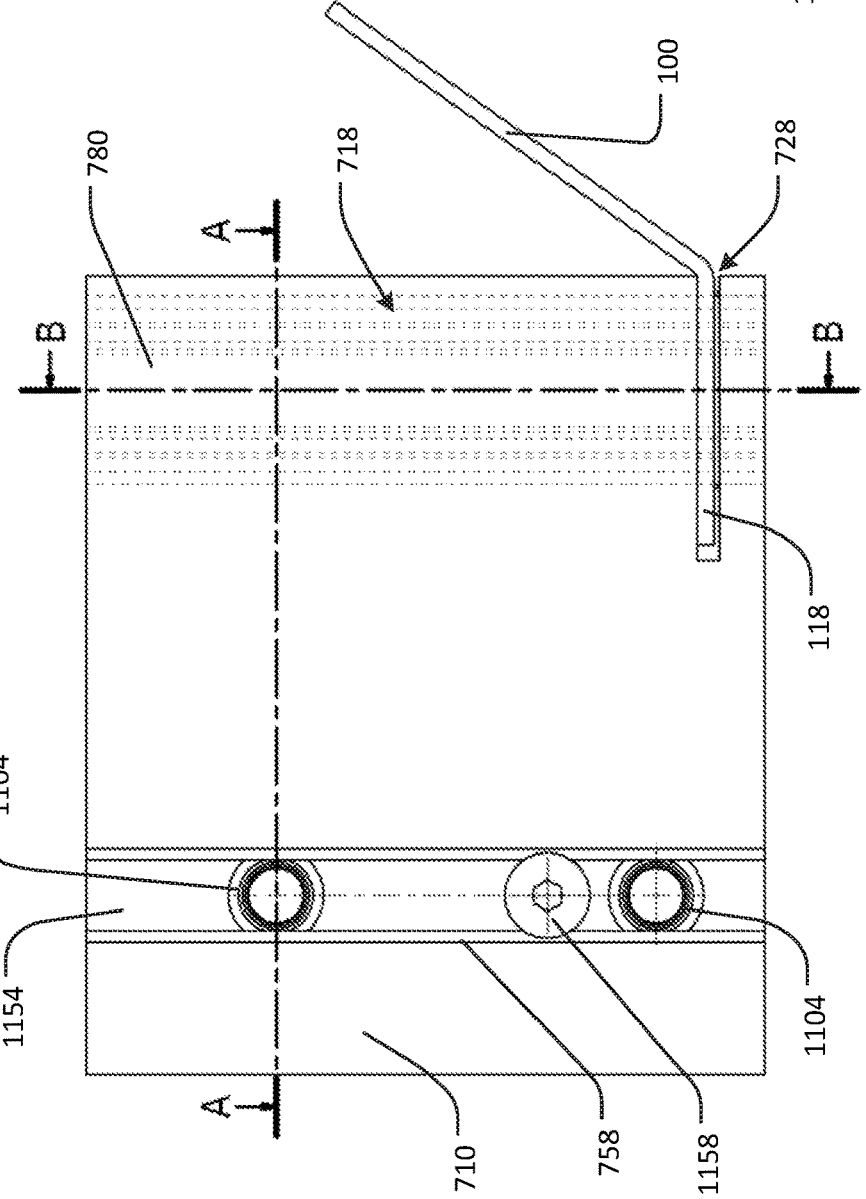

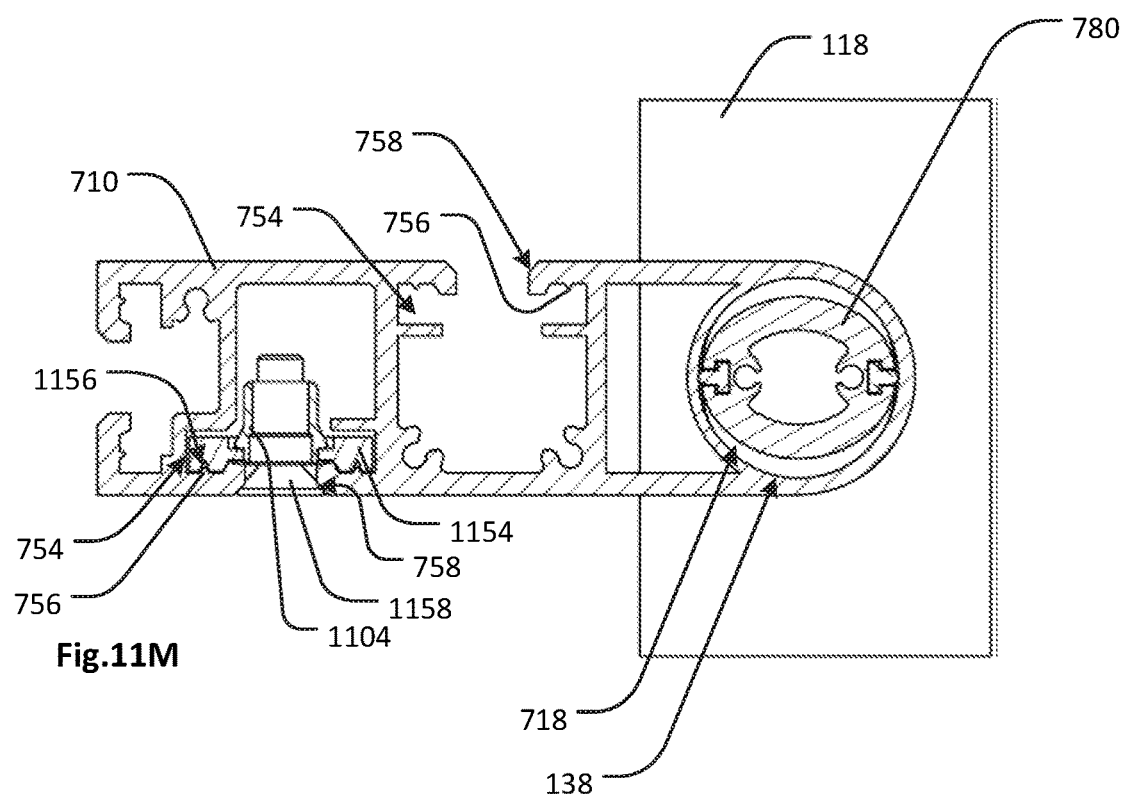
Fig.11M
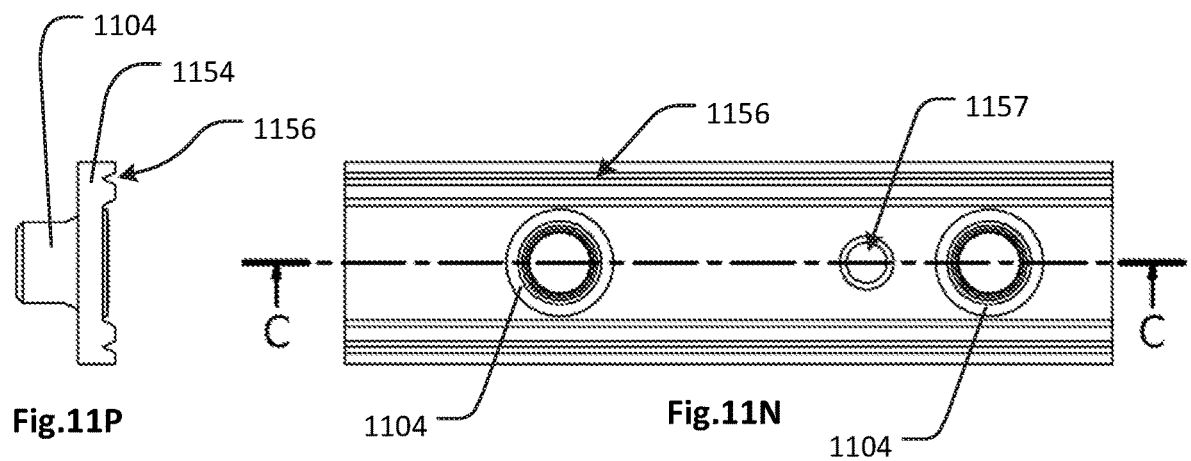
Fig.11P
Fig.11N
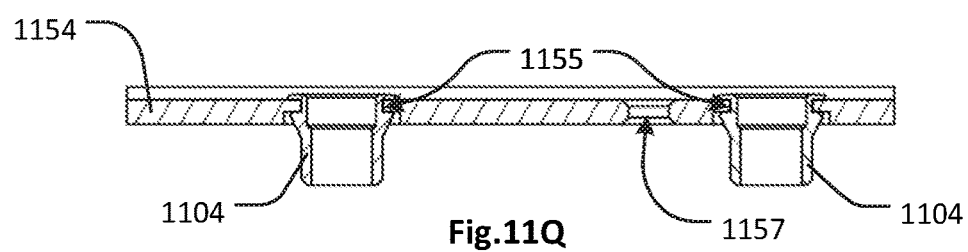
Fig.11Q

SCREENING ELEMENT, SCREEN ASSEMBLY AND MOUNTING SYSTEM

This application is a Nationalization under 35 USC § 371 of PCT Application No. PCT/US2020/0508978 filed on Aug. 27, 2020, which claims priority from Australian Application No. AU 2019903137, filed on Aug. 27, 2019, the entirety of each are hereby fully incorporate by reference herein.

TECHNICAL FIELD

Embodiments generally relate to a screening element, screen assembly, and associated fixing systems, components and methods. Such embodiments can be used for exterior protection of windows and/or building facades, particularly in commercial buildings and the like. Some embodiments relate to a lightweight screening element, awning or louvre blade that can be readily fixed and applied to the exterior of buildings or built structures so as to provide a screen.

BACKGROUND

The control and management of light and heat reaching and penetrating windows has a dramatic effect on the efficiencies and aesthetics of building structures and the occupation thereof.

Whilst the provision of external blinds, shutters and the like have found common use in many domestic buildings, houses and the like, different problems exist with commercial buildings and high-rise buildings that are not readily adapted to receive the fitting of external blinds, shutters and the like. In answer to this demand, a range of exterior awnings and louvres are available for use on commercial buildings. However, many of the currently available awnings and louvres are highly engineered, heavy and cumbersome constructions, many of which also fail to provide versatility and amenability to changing and alteration in accordance with demand or specific requirements of the customer.

One screening solution is described in International Patent Application No. PCT/AU2011/000861, made by the applicant of the present application and published as WO 2012/009743, the contents of which is hereby incorporated herein.

It is desired to address or ameliorate one or more shortcomings associated with existing screens and/or louvre blades, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Some embodiments relate to a screening element, comprising:
an elongate panel defining a first portion and a second portion angled relative to the first portion; and
at least one solar panel connected to the first portion of the elongate panel.

The second portion may include a solid portion that defines an array of apertures. An open area defined by the array of apertures may account for at least 30% of a total area of the second portion including the solid portion and open area, for example. In some embodiments, an open area defined by the array of apertures may account for at least 60% of a total area of the second portion including the solid portion and open area.

An angle of the screening element defined between a first direction normal to the first portion and a second direction normal to the second portion, may be between 60° and 160°, 80° and 140°, 80° and 120°, 80° and 100°, 85° and 95°, or about 90°, for example.

In some embodiments, the at least one solar panel covers substantially the entirety of an upper face of the first portion. The at least one solar panel may cover between about 50% and about 95% of an upper face of the first portion.

The elongate panel may have a length between about 1000 mm and about 3000 mm, between 2100 mm and 2700 mm, or about 2400 mm, for example.

In some embodiments, the system may further comprise cables and clamps configured to couple the screening elements to a structure.

Some embodiments relate to a screening kit comprising at least one screening element according to any one of the embodiments described herein, and further comprising cables and clamps configured to cooperate with the at least one screening element to couple the at least one screening element to a structure.

Some embodiments relate to a method for manufacturing a screening element, the method comprising:
forming an elongate panel defining a first portion and a second portion angled relative to the first portion;
forming an array of apertures in the second portion; and
attaching at least one solar panel to the first portion of the elongate panel.

In some embodiments, the method further comprises applying a treatment to the elongate panel, such as a surface coating, for example.

Some embodiments relate to a mounting system for mounting a screen assembly to a structure, the mounting system comprising:
an elongate rail defining a longitudinal channel and a plurality of lateral slots, each slot being configured to receive and accommodate part of a flange of a screening element in the channel and in the slot; and
a locking pin configured to be received in the channel and to extend through an apertures in the flange of the screening element to lock the screening element in place in the slot.

In some embodiments, the channel may define a circular profile, while the locking pin defines an elliptical profile. The locking pin may include one or more gripping inserts configured to abut an edge of the flange defining the aperture of the screening element.

In some embodiments, the mounting system may further comprise a slide nut plate configured to be received in a track defined by the rail, and configured to be mechanically fastened to a structure to mount the rail to the structure while allowing longitudinal movement of the rail relative to the structure by allowing the slide nut plate to slide along the track.

Some embodiments relate to a screen assembly kit comprising a plurality of screening elements according to any one of the embodiments described herein, and a plurality of mounting systems according to any one of the embodiments described herein.

In some embodiments, flanges of the screening element may define elliptical apertures. A major diameter of each elliptical aperture of the flanges may be larger than a major diameter of the locking pin, and a minor diameter of each elliptical aperture of the flanges may be larger than a minor diameter of the locking pin. In some embodiments, the major diameter of the locking pin may be similar to the minor diameter of each elliptical aperture of the flanges.

Some embodiments relate to a method of assembling a screen assembly using a screen assembly kit according to any one of the embodiments described herein, the method comprising: inserting the flanges of the screening elements in the lateral slots of the rails; and inserting the locking pins into the channels of each rail such that the locking pins extend through the apertures in the flanges.

The method may further comprise, rotating the locking pins in the channel of each rail to lock the screening elements into each rail.

Some embodiments relate to a screen assembly assembled according to the method according to any one of the embodiments described herein.

Some embodiments relate to a screen assembly comprising the elements of the screen assembly kit according to any one of the embodiments described herein, with the screening elements locked in place in the rails by the locking pins extending through the apertures in the flanges of the screening elements.

Some embodiments relate to a screen assembly comprising:
a plurality of screen elements, each screen element defining an elongate panel and two or more mounting flanges, each mounting flange defining two or more mounting apertures and each mounting flange being substantially similar to the other mounting flanges;
a plurality or rails, corresponding to the number of mounting apertures defined by each mounting flange, each rail defining a longitudinal channel and a plurality of lateral slots, each slot accommodating part of one of the mounting flanges of the screening elements; and
a plurality of locking pins, each locking pin being accommodated in the channel of one of the rails and extending through the mounting apertures of the mounting flanges accommodated in the slots.

Some embodiments relate to a building or structure comprising one or more screen assemblies according to any one of the embodiments described herein affixed thereto.

Some embodiments relate to a building or structure comprising one or more screening elements according to any one of the embodiments described herein affixed thereto.

BRIEF DESCRIPTION OF DRAWINGS

FIG. 2C is an end view of the screen assembly and screening element of FIG. 2A, viewed from one end along a longitudinal axis of the screening element;

FIG. 2D is a close-up perspective view of an example coupling arrangement of the screen assembly of FIG. 2A;

FIG. 3 is a perspective view of a U-shaped clamp portion of the coupling arrangement of FIG. 2D;

FIG. 4A is a perspective view of an isolating bush of the coupling arrangement of FIG. 2D;

FIG. 4B is an elevation view of the isolating bush of the coupling arrangement of FIG. 2D;

FIG. 7A is a perspective view of a mounting system, according to some embodiments, in a disassembled configuration;

FIG. 7B is a perspective view of the mounting system of FIG. 7A in an assembled configuration;

FIG. 11A is a perspective view of a mounting system, according to some embodiments, in an assembled configuration;

FIG. 11B is a perspective view of the mounting system of FIG. 11A in an disassembled configuration;

FIGS. 11F and 11G are a cross-sections of the mounting system of FIG. 11A as indicated in FIG. 11C as section A-A, illustrating unlocked and locked configurations of the mounting system, respectively;

FIG. 11K is a side view of a lower end of the mounting system of FIG. 11A;

FIG. 11L is a cross-section of the mounting system of FIG. 11A as indicated in FIG. 11K as section B-B;

FIG. 11M is a cross-section of the mounting system of FIG. 11A as indicated in FIG. 11K as section A-A;

FIG. 11N is a plan view of a slide nut plate of the mounting system of FIG. 11A (also visible in FIGS. 11H, 11J, 11K and 11M);

FIG. 11P is an end view of the slide nut plate of FIG. 11N;

FIG. 11Q is a cross-section of the slide nut plate of FIG. 11N, as indicated by section C-C in FIG. 11N.

DETAILED DESCRIPTION

Described embodiments generally relate to a screening element or louvre blade. Some embodiments relate to a screening element that can be applied to an exterior or facade of a building structure, to provide a screen for protective and/or aesthetic purposes. For example, some embodiments relate to a screening element configured to screen light, provide shade, and/or protect windows, particularly for commercial buildings and the like.

The screening element may alternately be referred to as a panel, blade, louvre blade, or form part of a screen, blind, or awning, for example. A plurality of ones of the screening element may be combined to form a screen which may be applied to a facade, wall or external windows of a building structure, for example. The screen may also be used to form a barrier such as a fence or wall, or may be erected as a shading structure in a substantially horizontal configuration, a substantially vertical configuration, or mounted at an angle to the horizontal.

Some embodiments relate to a screen assembly comprising one or more of the screening element and means for attaching the screening element(s) to a structure or building.

The screening element may comprise an elongate panel. For example, the screening element may comprise an elongate panel defining a first portion and a second portion angled relative to the first portion. The screening element may also comprise at least one solar panel connected to the first portion of the elongate panel.

An upper (first) portion of the elongate panel is configured to be oriented at a non-horizontal angle facing substantially upward when the elongate panel is installed on a structure. The elongate panel further comprises a lower portion, wherein the lower (second) portion is angled relative to the upper portion such that the elongate panel has an angled cross-section when viewed along a longitudinal axis of the screening element. One or more solar panels may be coupled to the upper portion of the screening element.

Figure 1A:
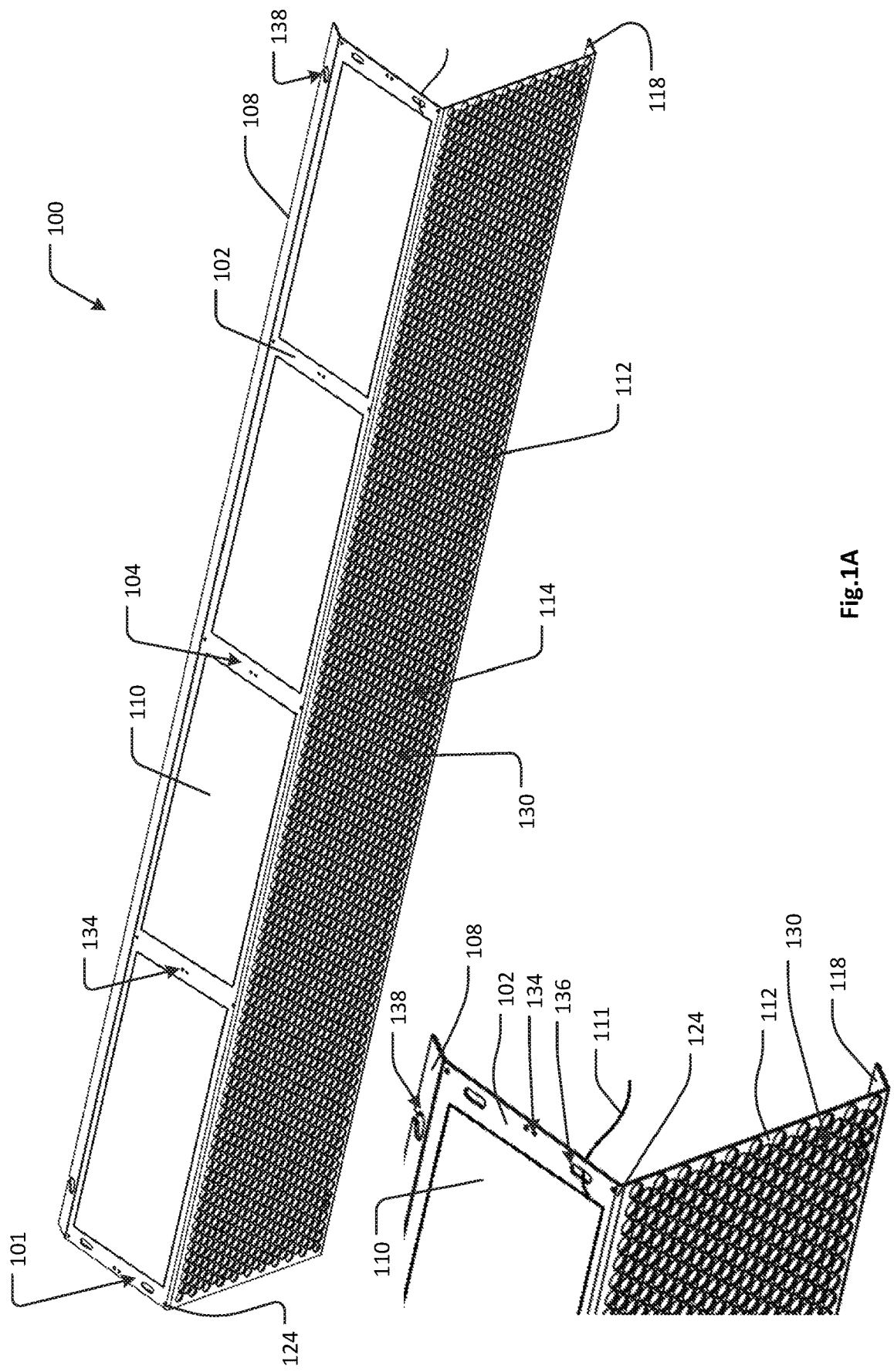
FIG. 1A is a perspective view and close up of part of a screening element, according to some embodiments.
Figure 1B:
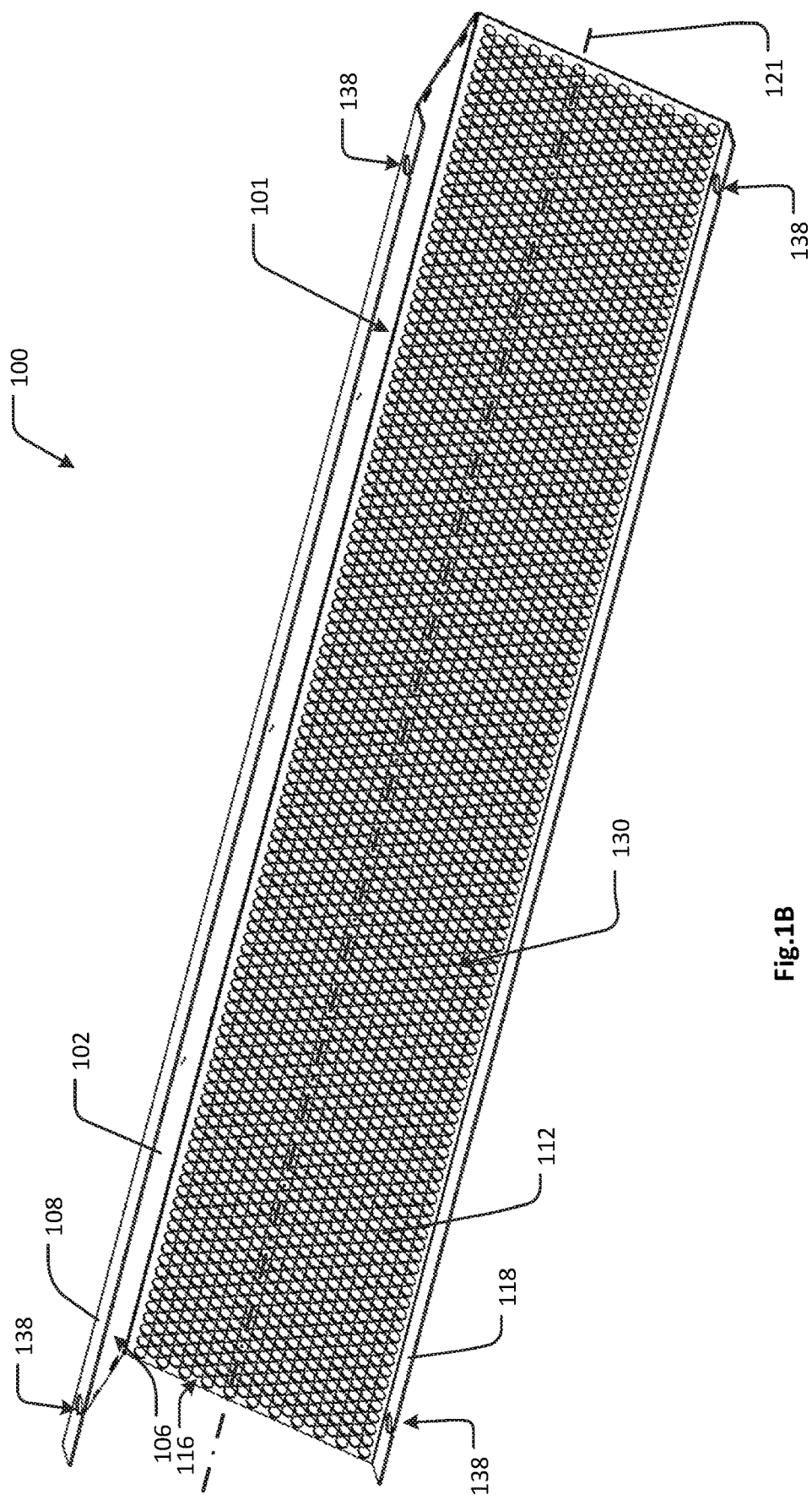
FIG. 1B is a rear perspective view of the screening element of FIG. 1A.

Referring to FIGS. 1A and 1B, a screen element 100 is shown, according to some embodiments. The screening element 100 comprises an elongate panel 101 that is elongate along a longitudinal axis 121. The panel 101 defines a first portion 102 and a second portion 112 angled relative to the first portion 102. The first portion 102 defines a first face (or external face) 104 (see FIG. 1A) and a second face (or internal face) 106 (see FIG. 1B). The second portion 112 defines a first face (or external face) 114 (see FIG. 1A) and a second face (or internal face) 116 (see FIG. 1B).

One or more solar panels 110, or an array of solar panels 110, may be connected to the first portion 102 on the first face 104. The solar panel(s) 110 may comprise any suitable solar panels, such as photovoltaic (PV) solar panels, or printed PV sheet solar panels, for example. The solar panels 110 may be mechanically coupled to the first portion 102 with mechanical fasteners, threaded fasteners, screws, bolts, brackets or clips, for example. Additionally, or alternatively, the solar panels 110 may adhesively bonded to the first portion 102. The solar panels 110 may be adhered to the panel 101 with adhesive or using a double-sided tape, such as VHB ("very high bond") tape manufactured by 3M, for example. The screen element 100 may be installed such that the solar panel array 110 is configured to receive sunlight and convert it to electrical energy. The electrical energy may be stored in a battery, and/or used to provide electrical power to equipment such as lights, display screens, or ventilation systems, or any other desired use in a building structure, for example.

Referring now to FIG. 1B, which is a reverse view of the elongate panel 101 shown in FIG. 1A, the first portion 102 further defines a second (internal) face 106 opposite the first face 104. Similarly, the second portion 112 further defines a second (internal) face 116 opposite the first face 114.

The panel 101 may be formed of sheet material, such as sheet aluminium, for example, which may be pressed, bent or folded to form the first and second portions 102, 112. The panel 101 may be bent or folded in parallel with the longitudinal axis 121, to define a substantially constant cross-sectional profile along a length of the panel 101.

In some embodiments, the first faces 104, 114 and the second faces 106, 116 may each comprise a single flat (planar) elongate surface that is substantially parallel to the longitudinal axis 121 of the panel 101. In some embodiments, the first faces 104, 114 and the second faces 106, 116 may comprise one or more curved surfaces.

The second faces 106, 116 may be oriented towards the structure or building when the screen element 100 is installed. The first faces 104, 114 may be oriented away from the structure or building.

The first and second portions 102, 112 may be connected by a bridging portion 124. For example, the bridging portion 124 may comprise a fold in the panel 101 defining the angle between the first and second portions 102, 112. In some embodiments, the bridging portion 124 may define a relatively narrow strip with a tight bending radius in the order of 1-10 mm, or similar to the material thickness, for example. In some embodiments, the bridging portion 124 may be larger, and may have a width in order of 10% or more of a width of the first portion 102, for example.

In some embodiments, the bridging portion 124 is formed by bending or folding a sheet of material so that the first portion 102 and the second portion 112 are connected in angled relation to each other. In some embodiments, the first portion 102 and the second portion 112 may be formed as separate pieces to be assembled, and the bridging portion 124 may comprise a connecting piece such as an angled bracket or a hinge, for example.

The first portion 102 further comprises a flap, lip of flange 108 extending from an edge of the first portion 102 opposite the bridging portion 124. Similarly, the second portion 112 further comprises a flap, lip or flange 118 extending from an edge of the second portion 112 opposite the bridging portion. The flanges 108, 118 of the panel 101 are configured to provide an attachment point or points for the elongate panel 101 to be mounted on a structure. For example, various mounting systems, components and methods are discussed below.

Figure 1D:
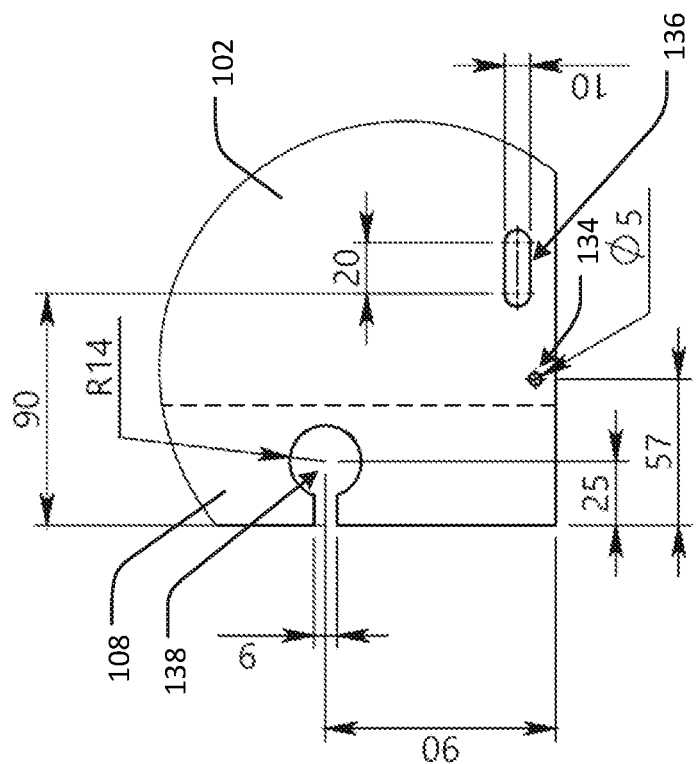
FIG. 1D is a close up of a flange of the screening element of FIG. 1A.
Figure 1C:
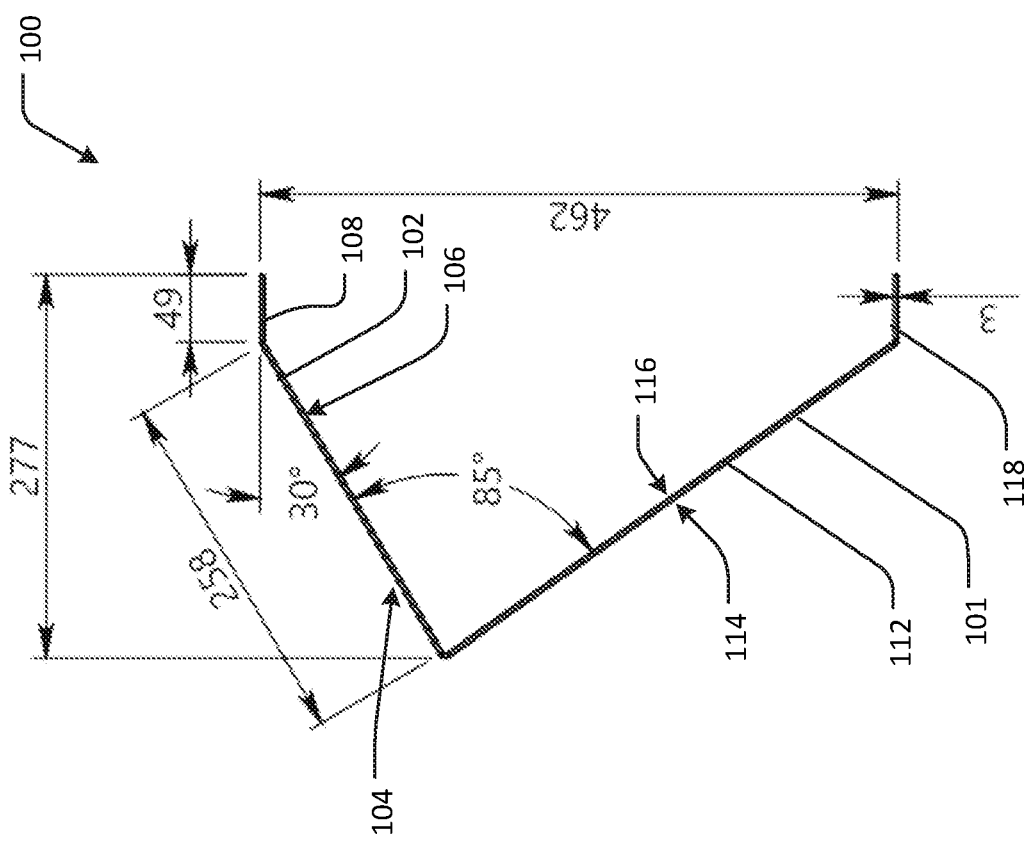
FIG. 1C is a side view of the screening element of FIG. 1A.
Figure 2A:
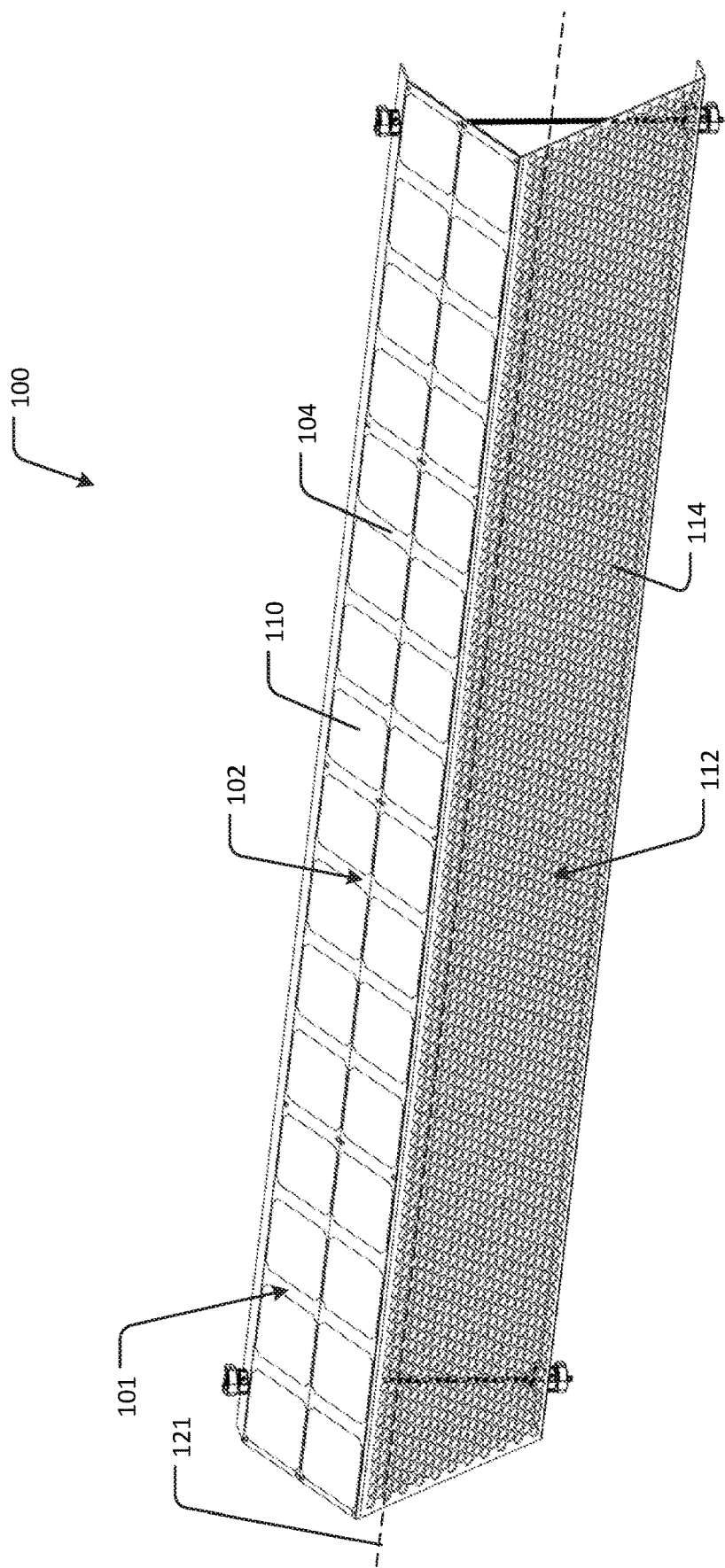
FIG. 2A is a perspective view of an embodiment of a screen assembly comprising a screening element.
Figure 2B:
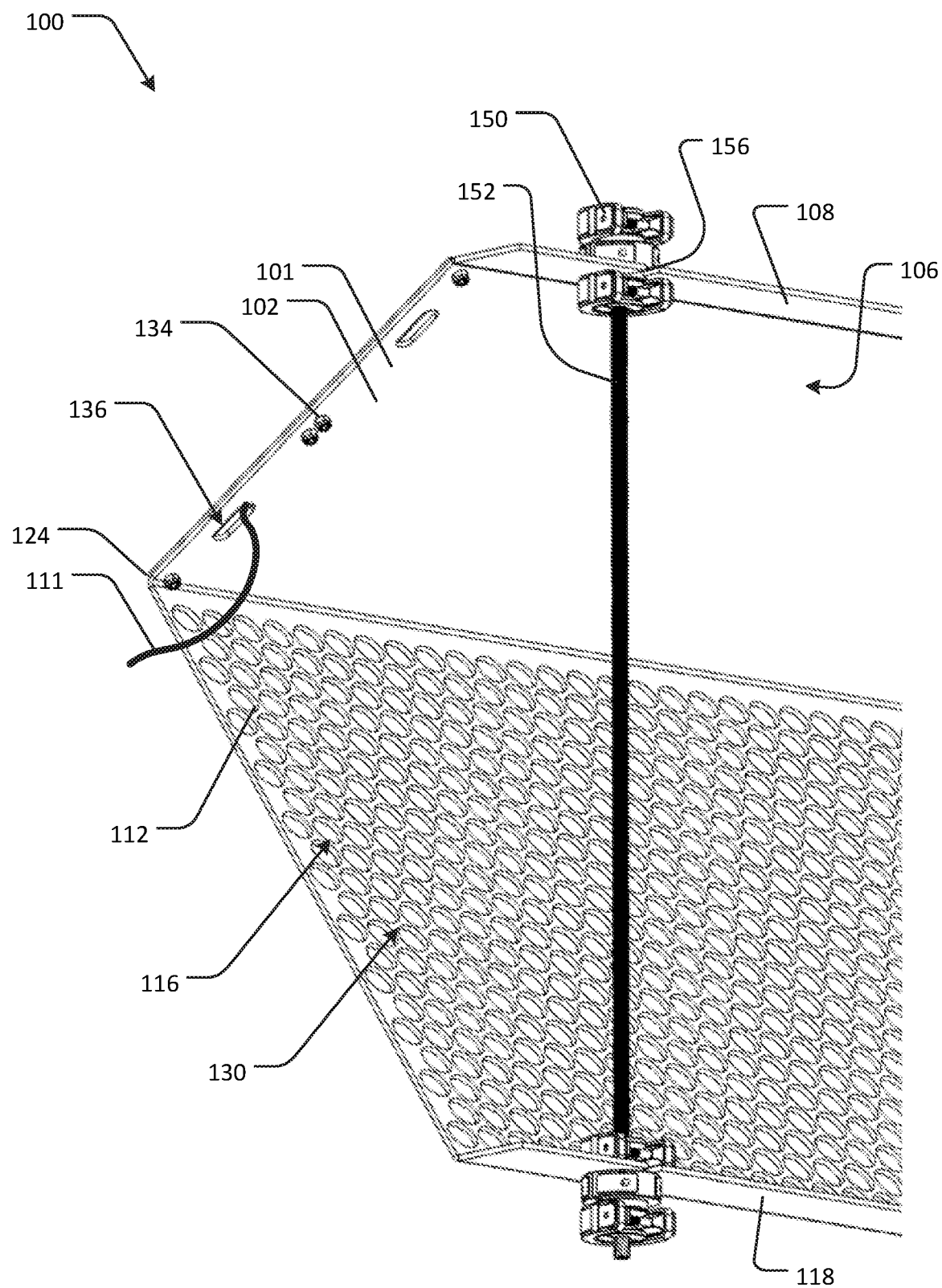
FIG. 2B is a reverse perspective view of the screen assembly of FIG. 2A.

In some embodiments, the flanges 108, 118 are formed at an angle to respective first and second portions 102, 112. In this manner, the stiffness and rigidity of the elongate panel 101 may be increased in comparison to a flat sheet. For example, the flanges 108, 118 may be folded away from the respective panel portions 102, 112 at an obtuse angle. In some embodiments, one or both of the flanges 108, 118 comprises a return fold to provide additional stiffness and rigidity to the panel 101. The flanges 108, 118 of the first and second portions 102, 112 may be formed to be parallel with each other, as shown in FIG. 1C.

In some embodiments, the panel 101 may have a maximum elongate dimension (length) between about 500 mm and about 3600 mm or between about 2000 mm and about 3000 mm or approximately 2400 mm, for example, wherein the maximum elongate dimension is measured parallel to the longitudinal axis 121.

In some embodiments, the panel 101 may have a maximum depth between about 150 mm to 1200 mm, between about 300 mm and about 800 mm, or between about 400 mm and about 600 mm, or approximately 460 mm, for example, wherein the maximum depth is measured between the flanges 108, 118, in a direction perpendicular to the longitudinal axis 121.

In some embodiments, the panel 101 may have a thickness, excluding the solar panel 110, measuring between 1 mm and 10 mm, 1.6 mm and 5 mm, 2 mm and 4 mm, or approximately 3 mm, for example.

In some embodiments, the panel 101 may define apertures 130 in at least one of the first and second portions 102, 112. In some embodiments, the apertures 130 may be arranged in a predetermined array. The array of apertures 130 may comprise apertures 130 arranged in a repeating pattern, or in an irregular pattern to form a certain design or text, for example. In some embodiments, a plurality of screen elements 100 may be combined to form a screen, and the apertures 130 on each panel 101 may be oriented such that they collectively form an image, pattern, design, or text that is visible from a certain distance and/or angle. The apertures 130 may be formed in any suitable shape, including circular, elliptical or crescent shaped, for example.

The size, shape, number and/or distribution of apertures 130 may be selected to achieve certain functions. For example, to control the amount of light passing through the screen element 100, to reduce the weight of the screen element 100, or to control the amount of air flow through the screening element 100. In some cases, it may be necessary to allow sufficient air flow for ventilation to facilitate convective cooling of the screening element 100, solar panels 110 and/or building facade.

In some embodiments, the panel 101 may include an array of apertures 130 formed in the first portion 102 across a substantial part of the first portion. For example, apertures 130 may be formed across around 30-50% of the panel face of first portion 102, with the remainder of the panel face being covered by one or more solar panels. In some embodiments, apertures 130 may be formed across most of the panel face and at least some of the apertures 130 may be covered or at least partially closed over by one or more solar panels 110. In some embodiments, apertures 132 are formed across around 10% of the panel face of first portion 102.

In some embodiments, the first portion 102 may also include fixing apertures 134 and cable apertures 136. The fixing apertures 134 and cable apertures 136 may be positioned along or close to side edges at opposite ends of the panel 101, as well as at longitudinally spaced intervals along the panel 101.

The fixing apertures 134 may be configured to receive a threaded fastener such as a screw or a bolt secured by a nut, to connect the solar panel 110 to the first face 104. In embodiments where the solar panel(s) 110 are adhesively bonded to the panel 101, the fixing apertures 134 and fasteners may be omitted. The cable apertures 136 may provide a convenient handling point for installation of the panel 101, and may provide access for cables 111 to connect the solar panel(s) 110 to a battery or electrical network. The cable apertures 136 may comprise slotted holes, or obround slots, for example.

In some embodiments, the second portion 112 may define an array of apertures 130 as described above. The array of apertures 130 may cover a large portion or substantially all of the second portion 112, as shown in FIG. 1A. A cumulative geometric area of the array of apertures 130 or open area of the apertures 130 may be a fraction of a total area defined by peripheral boundaries of the second portion 112, such as in the range of 5% to 75%, 20% to 70%, 30% to 60%, 30% to 50%, 20% to 40%, 10% to 30%, or approximately 30%, for example.

The extent of the open area of the apertures 130 on the first and second portions 102, 112 of the panel 101 can be selected based on the desired amount of solar heat gain or reduction, ventilation requirements, and/or aesthetics and requirements for light filtration and management. In some embodiments, the apertures 130 in the first portion 102 may provide a light transmission in the order of 0% to 40%, while the apertures 130 in the second portion 112 may provide a greater perforated open area, for example between 40 to 80%.

In some embodiments, the screening element 100 may be configured to reduce direct sunlight, instead absorbing the energy with the solar panels 110 on the first portion 102, while the second portion 112 may have a larger open area of apertures 130 to allow reflected light through the screen (and potentially allow visibility in a horizontal direction and/or down towards the ground).

Referring to FIG. 1C, the cross-sectional profile of the panel 101 is shown according to some embodiments (viewed in a direction parallel to the longitudinal axis 121). The first and second portions 102, 112 form an angle therebetween (in lateral cross-section). The angle may equivalently be defined between respective normal axes of the first and second portions 102, 112 defined perpendicular to the respective first faces 104, 114.

The angle between the first and second portions 102, 112 may be between 10° and 170°, 30° and 150°, 60° and 120°, 80° and 100°, 60° and 160°, 80° and 140°, 60° and 90°, 70° and 85°, or approximately 85°. In some embodiments, the angle between the first and second portions 102, 112 may be close to or slightly less than 90°, to maximise the area of solar panels 110 exposed to the sun when arranged to face the sun.

The flanges 108, 118 may be arranged to be parallel with each other, and angled relative to the first and second portions 102, 112 such that, when installed, the flanges 108, 118 are configured to be substantially horizontal, and the first portion 102 is arranged to optimise exposure to solar radiation during the day (or optimised for solar radiation at certain times of the day). This angle may vary depending on the installed orientation (cardinal direction) of the screen element 100, shading and power requirements, and the latitude of the installation site.

In some embodiments, the angle between the first portion 102 and the flange 108 may be between 100° and 170°, 145° and 170°, 120° and 165°, 130° and 160°, 140° and 155°, 145° and 150°, or approximately 150°.

Figure 12:
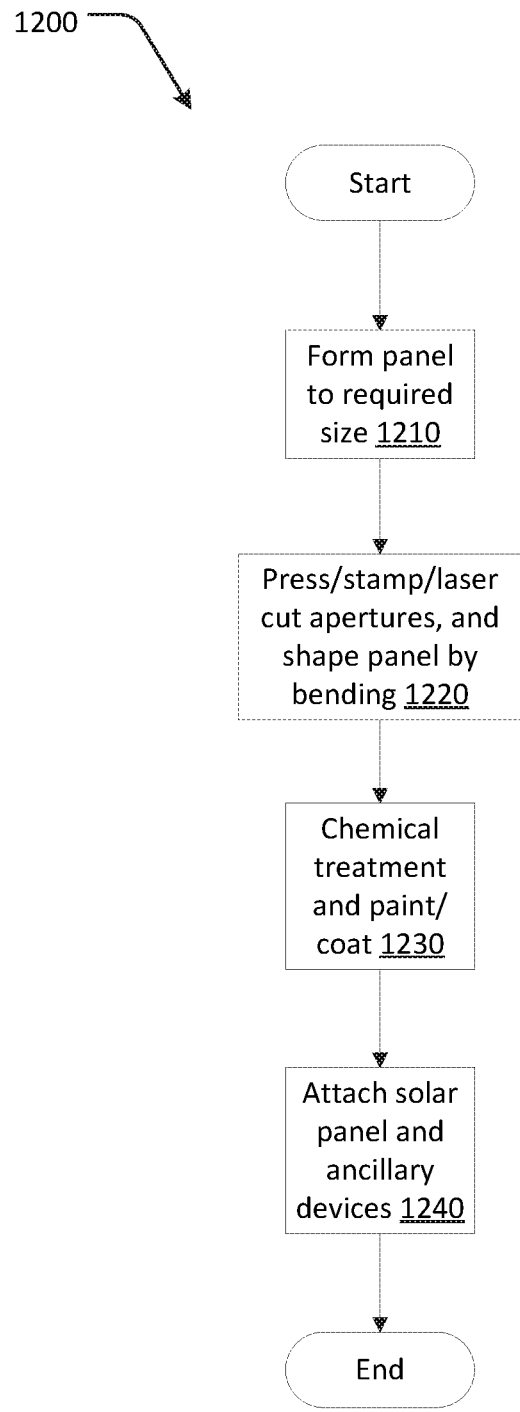
FIG. 12 is a flowchart of a method for manufacturing a screening element, according to some embodiments.
Figure 13:
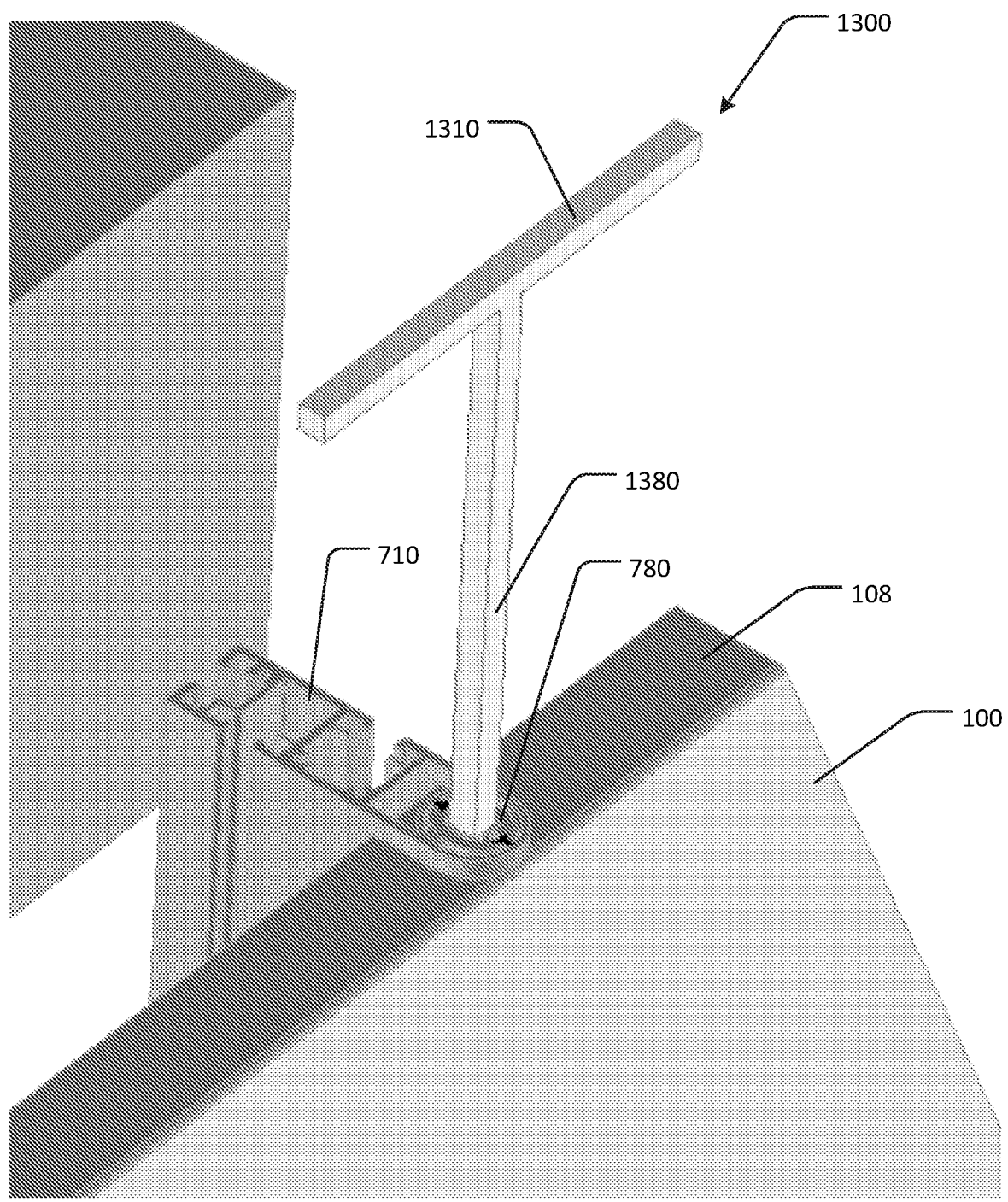
FIG. 13 is a perspective view illustrating use of a tool to insert and lock a locking pin of a screen assembly, according to some embodiments.

In some embodiments, the panel 101 may alternatively have a variety of cross-section shapes when viewed along the longitudinal axis 121. For example, the cross section of the panel 101 may vary in some embodiments as shown in FIGS. 12 and 13 of PCT/AU2011/000861.

In some embodiments, the flanges 108, 118 may define mounting apertures 138 to assist in mounting the screening element 100 on a fixing or mounting system/structure. Alternative systems, components and methods for fixing or mounting the screening element 100 to a structure such as a building are described below. One system involves mounting the screening element 100 on mounting cables. In that case, the mounting apertures 138 may be open to the peripheral edge of the flange 108, 118 (as shown in FIG. 1D) to allow passage of the mounting cable into the aperture 138 through the open side. Another system involves mounting the screening element 100 in a mounting rail which defines slots configured to receive the flanges 108, 118. In that case, it may not be necessary to provide an opening in the side of the mounting apertures 138, and the apertures 138 may be defined by a single closed-loop edge. The mounting apertures 138 may be generally round in shape, and may comprise circular or elliptical apertures, keyhole apertures, obround apertures or slotted holes, for example.

Referring to FIGS. 2A to 5B, the elongate panel 101 may be attached to the structure or building by means of a clamp assembly 150. In some embodiments, the clamp assembly 150 attaches to a system of tensioned wires or tensioned cables fitted to or suspended from the outside of the structure or building.

The system of tensioned cables comprises multiple cables 152, for example made from a steel wire, rope or cable, measuring 8 mm in diameter, although other cable materials and dimensions may be used. Each cable 152 may be tensioned and anchored to provide sufficient support to the panel assembly 100 such that when the panel is installed, movement of the panel towards or away from the structure is reduced, for example under high wind loads. In some embodiments, some reduced movement of the panel may be desirable, for example to absorb or attenuate impacts on the panel assembly 100.

In some embodiments, when the elongate panel 101 is attached to the structure, the longitudinal axis 121 of the panel 101 is oriented substantially perpendicular to the extension direction of the cables 152. The cables 152 may be oriented in a vertical direction, wherein said vertical direction comprises the cables spanning substantially vertically between an upper region, which may be disposed towards the top of the structure, and a lower region, which may be disposed towards the ground level, for example. The panel 101 may be installed with its longitudinal axis 121 in a horizontal orientation.

The cables 152 may be fixedly coupled to the structure by any suitable means, such as brackets, loops or other fasteners.

In some embodiments, alternative fastening methods may be used to attach the elongate panel 101 to the structure. For example, the panel 101 may be bolted directly onto a structure or a facade or mounted using the one of the mounting systems 700, 1100 described below.

Referring now to FIGS. 2A to 2D, the screening element 100 may be fixed to the cables 152 with a clamping assembly 150. The cables 152, and optionally part of each clamping assembly 150 may be partially accommodated within the mounting apertures 138 in the flanges 108, 118. Each flange 108, 118 may define a slot 156 adjacent each mounting aperture 138 to allow passage of the cable 152 (and optionally part of the clamping assembly 150) into the aperture 138 laterally from a side edge of the flange 108, 118. The mounting apertures 138 may be of an obular or keyhole shape, for example, or may be circular, as shown in FIG. 1D. The shape and dimensions of the slot 156 and aperture 138 may be adapted to cooperate neatly with a diameter of the cable 152.

Figure 5A:
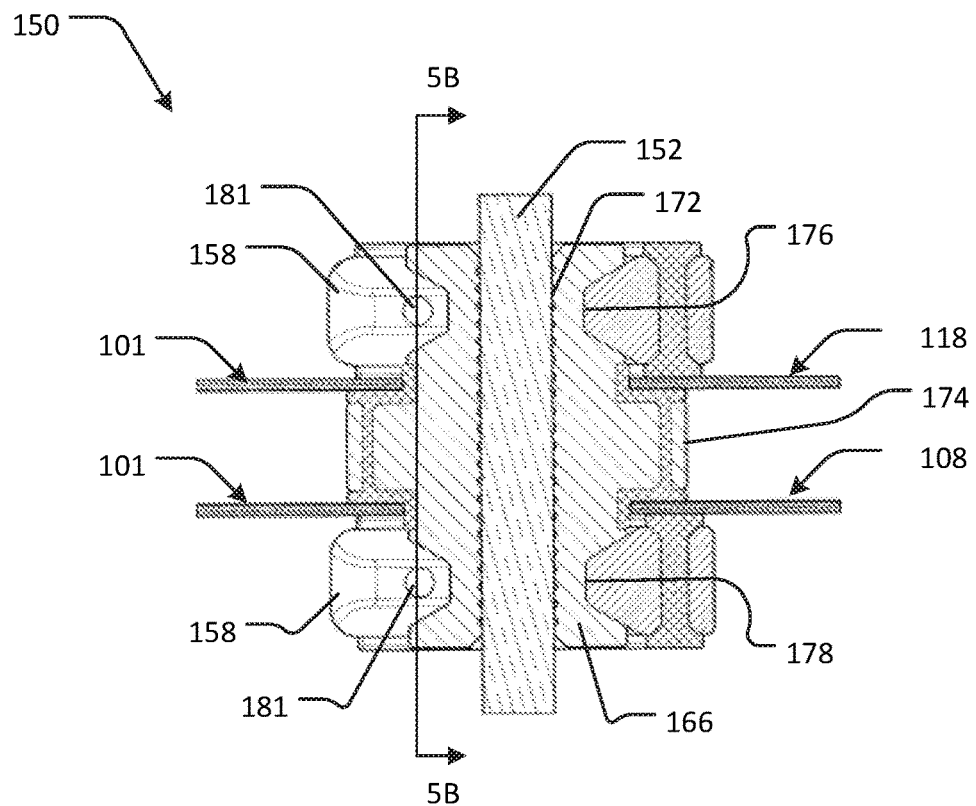
FIG. 5A is a first section view of the assembled coupling arrangement of FIG. 2D, as seen along section line 5A-5A of FIG. 5B.
Figure 5B:
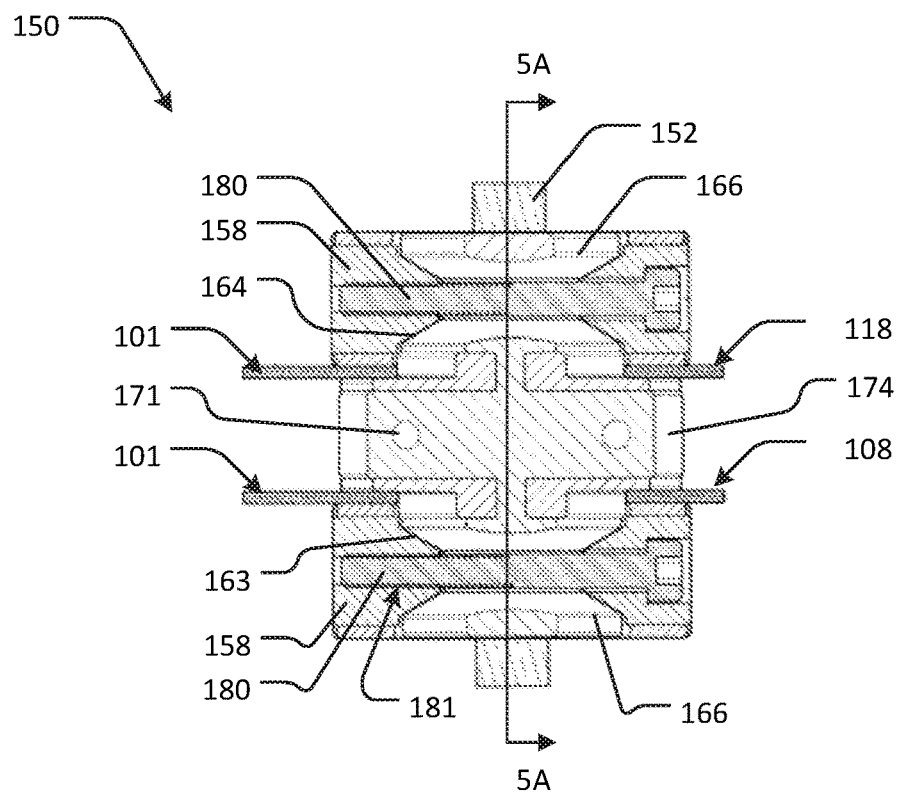
FIG. 5B is a second section view of the assembled coupling arrangement of FIG. 2D, as seen along section line 5B-5B of FIG. 5A.

The clamp assembly 150 comprises a U-shaped clamp portion 158, shown in FIG. 3, and an isolating bush 166, shown in FIGS. 4A and 4B. The clamp portion 158 is configured to be clamped to a portion of the isolating bush 166 as shown in FIGS. 5A and 5B. The isolating bush is configured to engage a portion of the cable 152 and engage a portion of the panel 101 such that when the U-shaped clamp portion 158 is clamped to the bush 166, the cable and panel are substantially fixed relative to each other. In some embodiments, the flanges 108, 118 are mounted on the cables 152 perpendicular to the cables 152. Though in other embodiments, the flanges 108, 118 may not be perpendicular with the cables 152.

Referring now to FIGS. 3-5B, the U-shaped clamp portion 158 has an internal clamp neck portion 160 connected to two clamp arm portions 162, where the clamp neck and arm portions include upper and lower engaging faces 163, 164 that span the neck and arm portions. The clamp portion 158 is adapted to co-operate with the isolating bush 166 as shown in FIGS. 5A and 5B.

The isolating bush 166 comprises a first part 168 and a second part 170, a central spacing ring 174, and an assembly structure 171, which may include a threaded hole and threaded fastener, for example. In the embodiment shown in FIGS. 4A and 4B, the first part 168 and the second part 170 are separated longitudinally and are substantially mirror images of each other. When the first and second parts 168, 170 are assembled, they define an internal region 172 to receive a short length of the cable 152. The central spacing ring 174 may be formed integrally with the first and second parts 168, 170 (or may be a separate component in some embodiments) and is disposed towards the midsection of the assembled first and second parts. The first and second parts 168, 170 define on their outer surfaces an upper clamp channel 176 and a lower clamp channel 178, whereby the upper clamp channel and the lower clamp channel are disposed toward opposite ends of the assembled first and second parts, either side of the central spacing ring 174.

The upper and lower clamp channels 176, 178 are shaped and configured to snugly receive the engaging faces 163, 164 of the clamp neck portion 160 and the clamp arm portions 162 of the U-shaped clamp portion 158. When the U-shaped clamp portion 158 is in an engaged position, as shown in FIGS. 5A and 5B, a second assembly structure 180 engages the two clamp arm portions 162 such that the clamp portion 158 tightens the engaging faces 163, 164 against the upper and lower clamp channels 176, 178. This then causes the isolating bush 166 to exert (via the internal region 172) a clamping force on the cable 152.

The internal region 172 may comprise a threaded, knurled, or other textured surface to provide an increased surface area to assist the isolating bush 166 in gripping the cable 152. The internal region 172 may comprise a deformable or elastic liner to provide increased friction to assist the isolating bush 166 in gripping the cable 152. In some embodiments, the internal region 172 comprises a smooth surface to distribute the clamping force evenly over the length of the clamped section of the cable 152.

In some embodiments, the second assembly structure 180 comprises threaded holes and a threaded fastener, such as a bolt, for example. The bolt is received in an aperture 181 that may define a thread which corresponds to the thread on the threaded fastener. Tightening the bolt draws the clamp arms 162 together so as to snugly clamp around the isolating bush 166 so as to effect the clamping and location of the two parts 168, 170 of the isolating bush together so as to snugly engage the internal region 172 to the cable 152. In addition, tightening of the bolt and the tightening action causing the closing of the clamp arms 162 may result in a small amount of distortion of the clamp arms as they are drawn together by the tightening action of the bolt such that the clamp arms are caused to close around the isolating bush 166 such that, if the bolt is loosened, that will not detrimentally affect the performance of the clamp assembly 150 and the distortion of the clamp arms may ensure that the clamp assembly remains tightly fitted and attached to the cable even without the security of the bolt.

FIG. 5A shows a first section view of the abovementioned clamp assembly 150, wherein the section is taken along a longitudinal axis of the cable 152 (corresponding to line 5A-5A in FIG. 5B) to show the interaction between the cable, the internal region 172, the isolating bush 166, the U-shaped clamp portion 158, and the panel 101.

FIG. 5B shows a second section view of the abovementioned clamp assembly 150, where the section is taken along the line marked as 5B-5B in FIG. 5A, to show an example position and arrangement of the first and second assembly structures 171, 180.

Each clamp assembly 150 may clamp a single flange 108, 118 to a cable 152, with the flange 108, 118 disposed between the spacing ring 174 and one of the U-shaped clamp portions 158. When multiple screening elements 100 are mounted to cables 152, the upper flange 108 and lower flange 118 of adjacent screening elements 100 may be fixed to the cable 152 with the flanges 108, 118 disposed on either side of the spacing ring 174, and the U-shaped clamp portions 158 disposed on either side of the flanges 108, 118, as shown in FIGS. 5A, 5B and 6B.

Figure 6A:
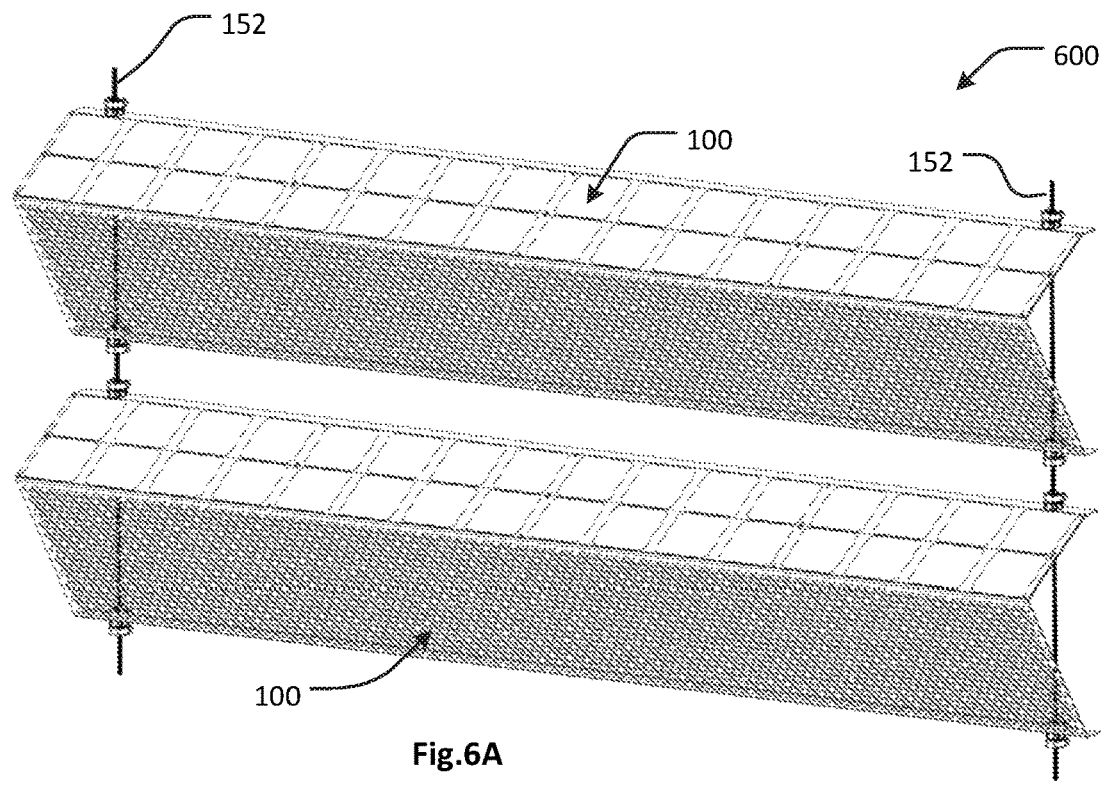
FIG. 6A is a perspective view of a screen assembly according to some embodiments.
Figure 6B:
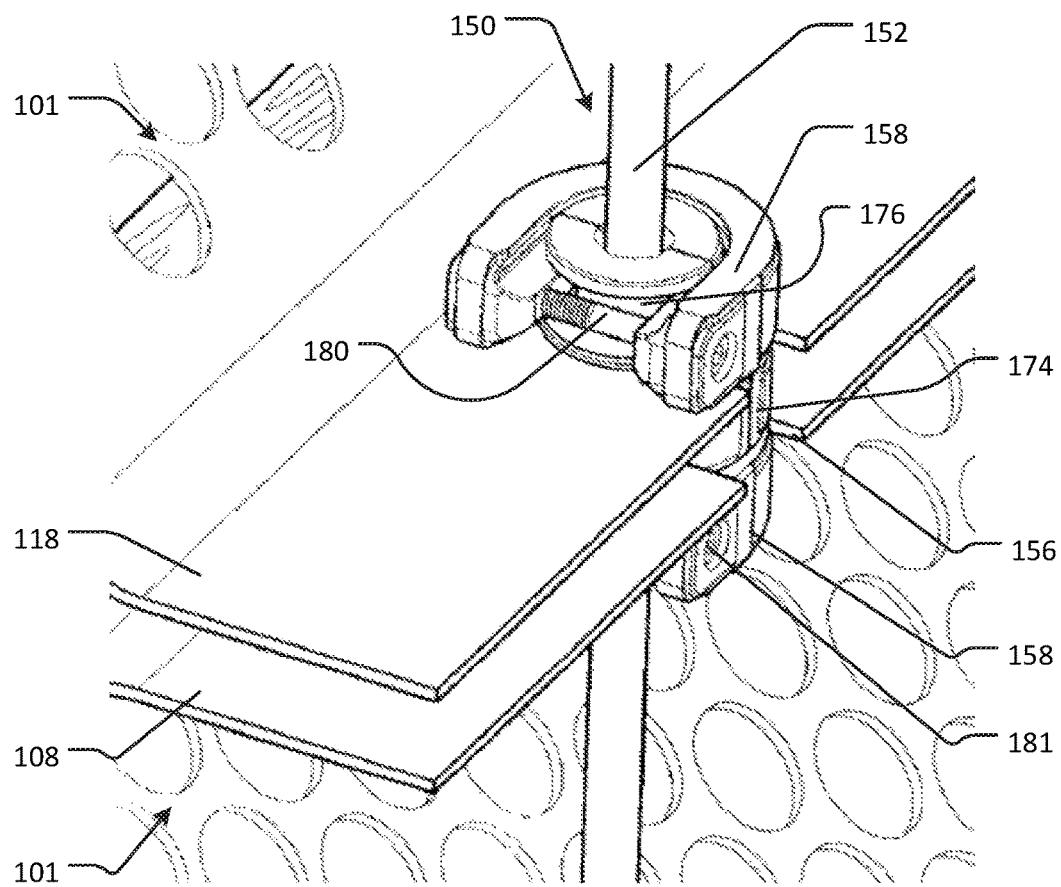
FIG. 6B is a close-up perspective view of the coupling arrangement of the screen assembly of FIG. 6A.

In this way, multiple screening elements 100 can be fixed to cables 152 and to form a screen assembly 600, as shown in FIG. 6A. The screen assembly 600 may then be mounted to a building structure as discussed above.

In some embodiments the panel assembly 100 is fitted and installed to a structure 120 such as a building, by way of tensioned cables 152 fitted to the outside of the building. Referring again to FIG. 6A, a plurality of tensioned cables can receive a plurality of panel assembly 100, fitted up a vertical height thereof, wherein the plurality of panel assembly 100 comprises a plurality of elongate panel 101 which are readily clipped and fitted onto the tensioned cables by a plurality of clamp assembly 150, which may anchor either side of the cable immediately abutting the lips 108, 118 of each panel 101.

In an example of the installation process, at least one isolating bush 166 is clamped to at least one cable 152 in a configuration that corresponds with the location of mounting apertures 138 and slots 156 on panel 101, wherein the quantity of isolating bushes 166 is equal to the quantity of slots 156. The panel 101 is positioned onto the isolating bush such that the flanges 108, 118 are seated onto the clamp arms 162.

In the embodiment shown in FIGS. 5 and 6, where two of panels 101 are installed one above the other, the second lip 118 of the panel 101 may be seated on an upper part of the spacing ring 174, and the first lip 108 of the panel may be seated on an lower part of the spacing ring 174 such that the adjacent panels are separated by the spacing ring.

Once the panels are fitted, the clamp portion 158 may be then be inserted around the clamp annuli 176, 178 and fitted by way of the second assembly structure 180 so as to securely locate two of the panels 101 with respect to the isolating bush 166. The isolating bush 166 may then be able to accommodate the cable 152 running along the centre thereof, such that the panels 101 are effectively and securely located relative to the cable 152 by virtue of the friction exerted by the clamp assembly 150 on the cable 152.

While the fixing means for securing the panels 101 to the cables 152 as previously described may provide secure and adequate mounting of the louvre blade in order to provide an additional safety feature, in some embodiments an additional parallel safety cable (not shown) may be provided, which may be adapted to pass through captive safety cable holes or apertures formed mid-way along the lip 108, 118 of the panels 101, such that the aperture is able to capture and fully contain the cable and provide a secure fixing of the louvre blade to the building in the highly unlikely event that the slots 156 fail to adequately hold the panel 101.

In this manner, the described panel assembly 100 may provide a ready means of lightweight screening to a structure 120 with light control and management, where a series of vertically positioned and tensioned cables 152 are fitted to the exterior of a structure or building. The cables 152 may be horizontally spaced apart to correspond with the length of the panel assembly, and in some embodiments may have two, three or four cables supporting the length of each panel assembly.

Referring to FIG. 6A, embodiments of a screening system are illustrated comprising a plurality screening elements making up the panel assembly 100. Each screening element of the panel assembly 100 is attached to the cable 152 by a plurality of the clamp assemblies 150. While two cables 152 are shown, a different number of cables 152 may be used depending on the structure and panel. In this example configuration, each of the cables 152 is oriented in a vertical direction against or adjacent a structure 120 (not shown). Each cable 152 is parallel to the next cable. The screening element comprising elongate panel 101 can be attached to the cables 152 in a manner such that the plurality of panels 101 of the panel assembly 100 are disposed one above the other. In this way, a screening system comprising such a plurality of panels 101 can be mounted as a facade across a vertical face of the structure or building. Such a screening system can act as a decorative screen while at the same time providing a shading function and harvesting solar energy from sunlight impinging on the solar panels carried by the screening elements. Depending on requirements, the screening system can have anywhere from one to several hundred separate panels 101 arrayed across vertical surfaces of the structure to which it is mounted, for example.

Referring to FIGS. 7A to 7F, a fixing or mounting system 700 is shown according to some embodiments. The mounting system 700 comprises a rigid rail 710 configured to receive a plurality of the screening elements 100 to form a screen assembly 800, as shown in FIGS. 8A to 8C. The rail 710 may then be fixed to part of a building structure 1000, to mount the screen assembly 800 on a facade of the building structure 1000, as shown in FIGS. 9A to 9C and FIG. 10.

Referring to FIGS. 7A and 7B, the mounting system 700 is illustrated showing parts of each component of the mounting system 700 and the way that the components are assembled to mount the screening element 100 in the rail 710.

The rail 710 comprises an elongate body 712 defining a locking tube channel 718 configured to receive a locking tube 780. The rail 710 may define a constant lateral cross-section along substantially an entire length of the rail 710 (note: only one end of the rail 710 is shown in FIGS. 7A to 7F). For example, the rail 710 may be formed as an extrusion.

The rail 710 also defines a plurality of lateral slots 728 (i.e., lateral to a length of the channel 718) configured to receive the flanges 108, 118 of the screening element 100. Each lateral slot 728 forms an opening in a side of the channel 718. Note: only one lateral slot 728 and one flange 108 (of part of a screening element 100) are shown in FIGS. 7A to 7F.

When the flange 108 (or 118) of a screening element 100 is inserted into one of the lateral slots 728 (as indicated in FIG. 7A), part of the flange 108, 118 passes across the channel 718 through the slot 728 until the free edge of the flange 108, 118 abuts a rear wall 729 of the lateral slot 728. The slot 728 may be configured such that when the flange 108, 118 abuts the rear wall 729 of the slot 728, the mounting aperture 138 of the screening element 100 is substantially in alignment with the channel 718. That is, in alignment relative to a direction perpendicular to the length of the channel 718 and perpendicular to the longitudinal axis 121 of the screening element 100.

The screening element 100 may be slid within the slot 728 in a direction parallel to the longitudinal axis 121 of the screening element 100 (i.e., sideways) until the mounting aperture 138 is in alignment or coaxial with the channel 718. The screening element 100 may then be fixed or locked in place by inserting the locking tube 780 in the channel 718, as indicated in FIG. 7A.

Once the locking tube 780 has been inserted in the channel 718, an end cap 790 may be fixed to the end of the rail 710 to hold the locking tube 780 in place within the channel 718.

Figure 7D:
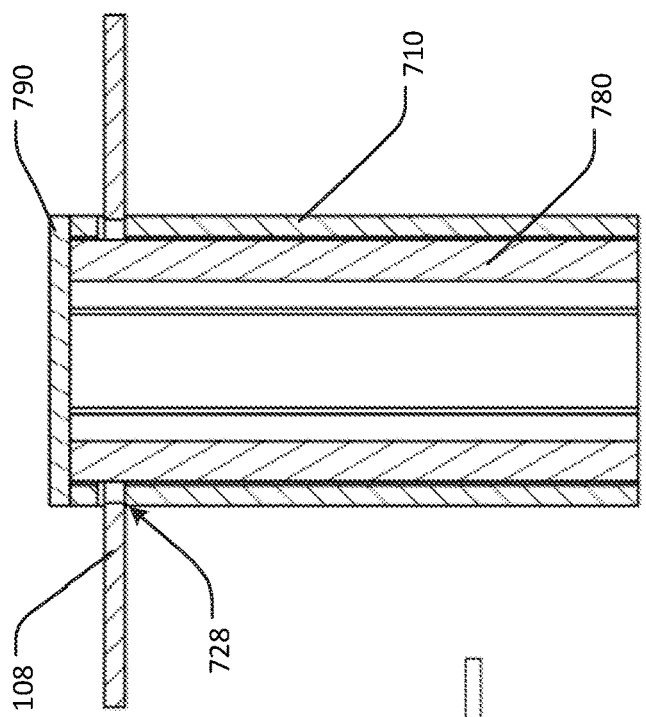
FIG. 7D is a cross-section of the mounting system of FIG. 7A as indicated in FIG. 7C as section B-B.
Figure 7C:
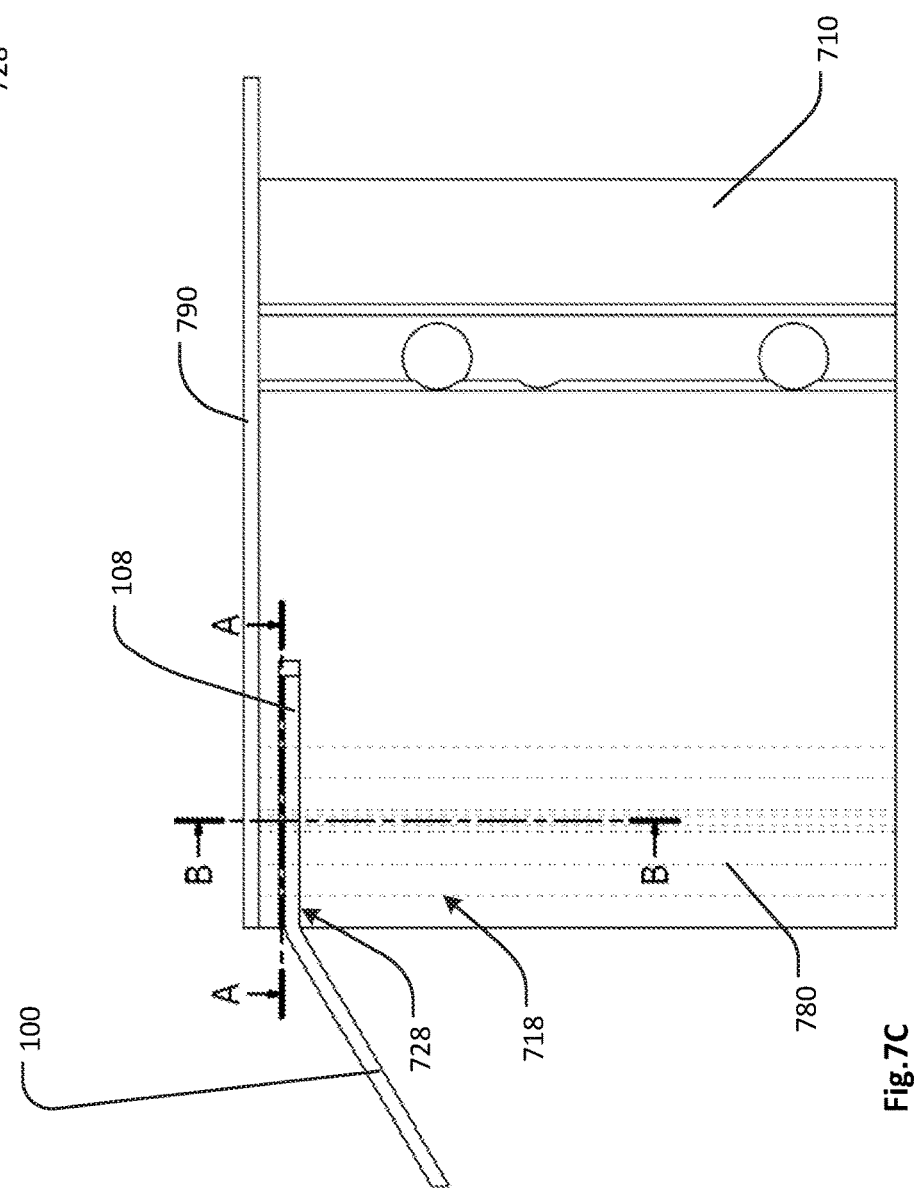
FIG. 7C is a side view of the mounting system of FIG. 7A.
Figure 7F:
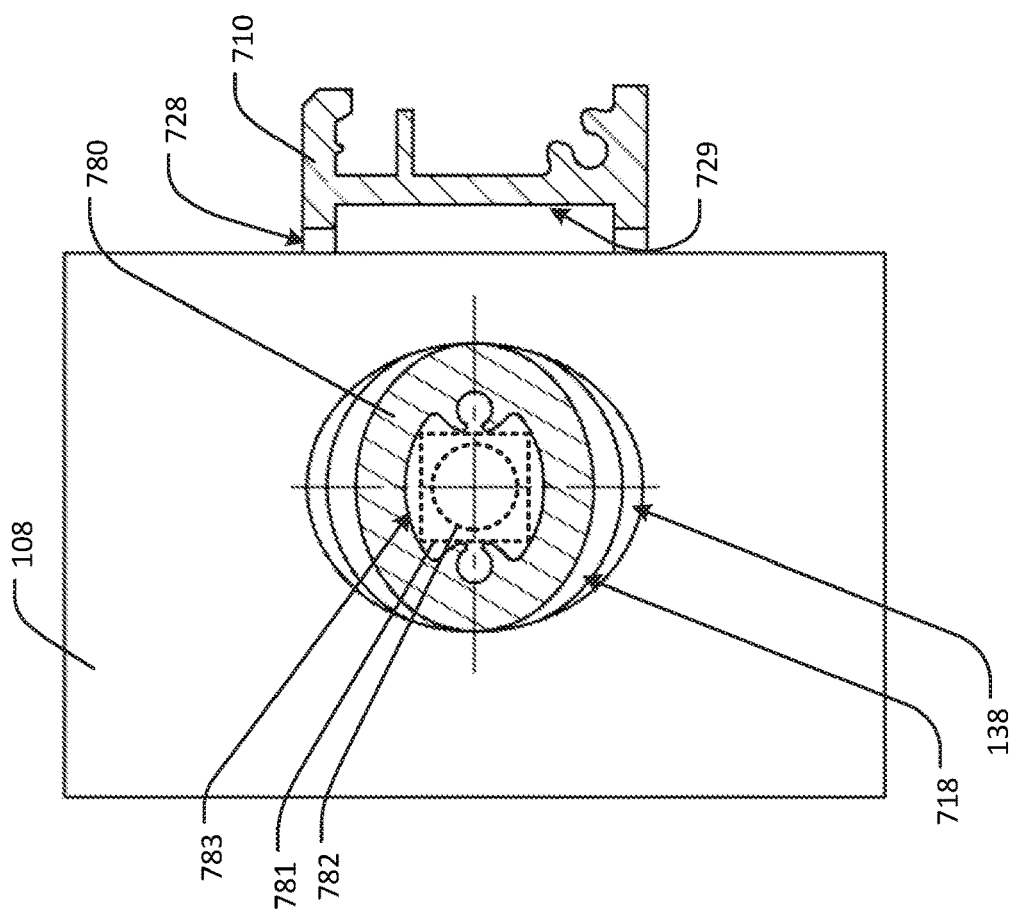
FIGS. 7E and 7F are a cross-sections of the mounting system of FIG. 7A as indicated in FIG. 7C as section A-A, illustrating unlocked and locked configurations of the mounting system, respectively.
Figure 7E:
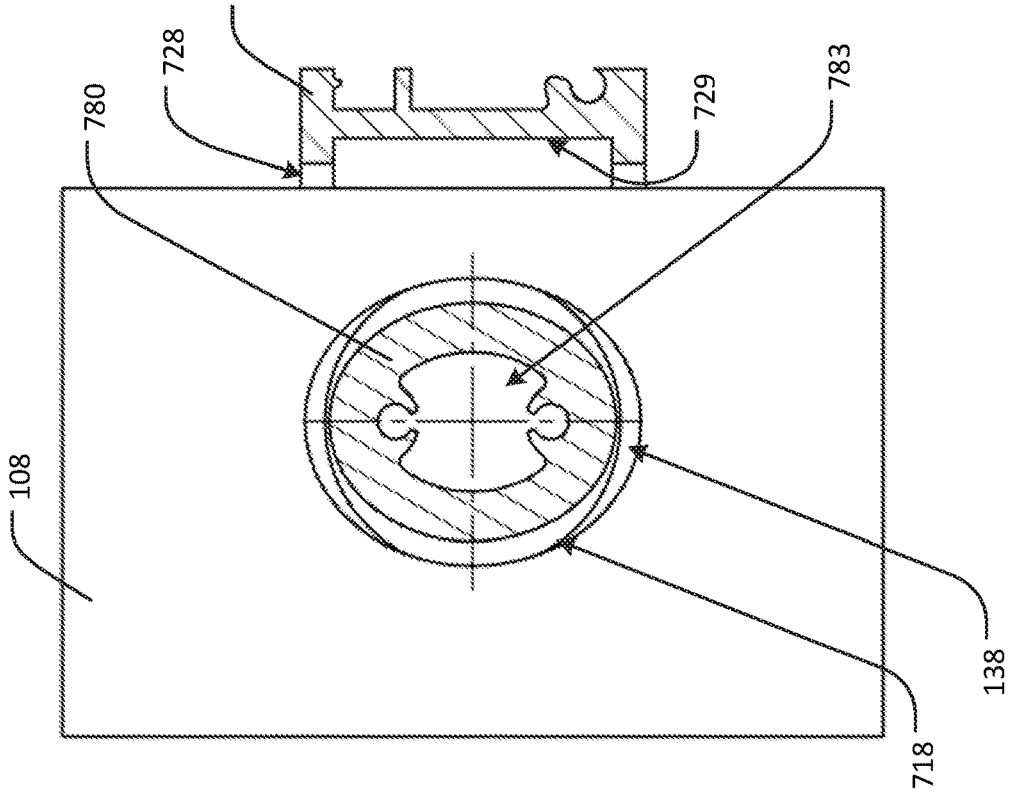
Figure 8C:
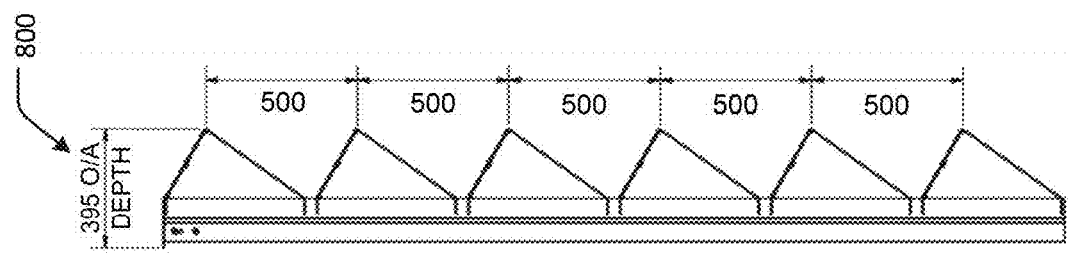
FIGS. 8A to 8C illustrate a screen assembly according to some embodiments.
Figure 8B:
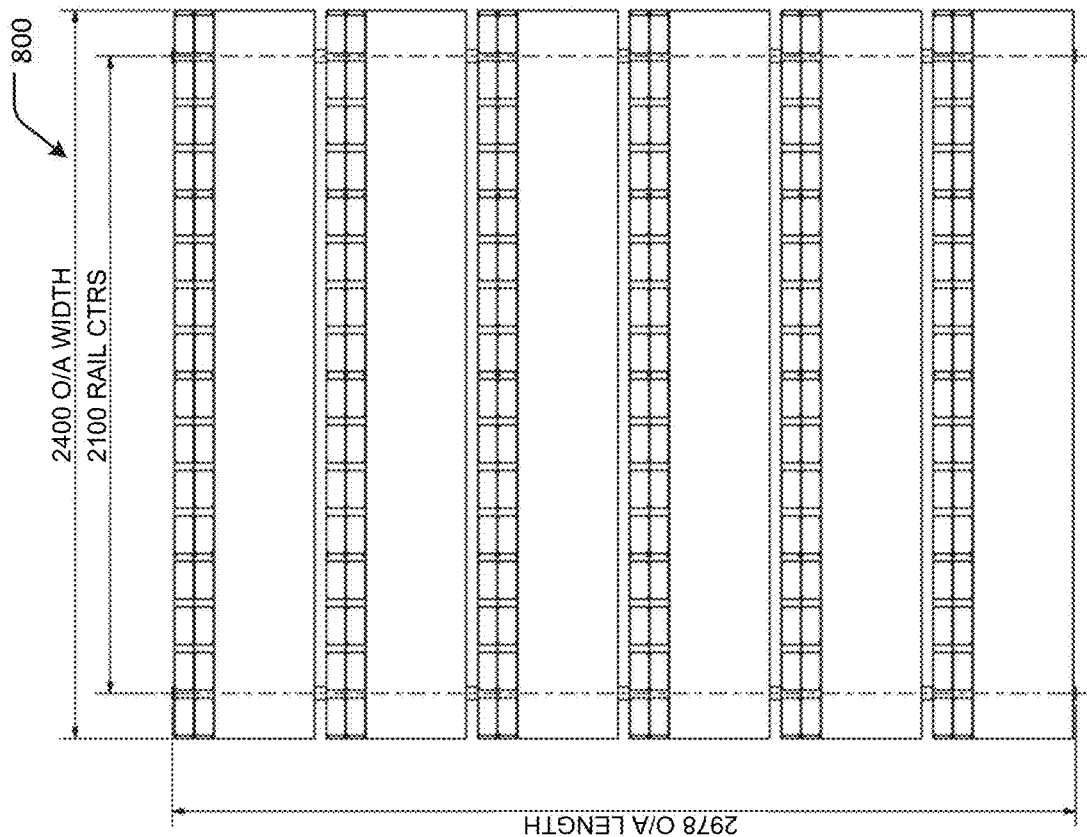
Figure 8A:
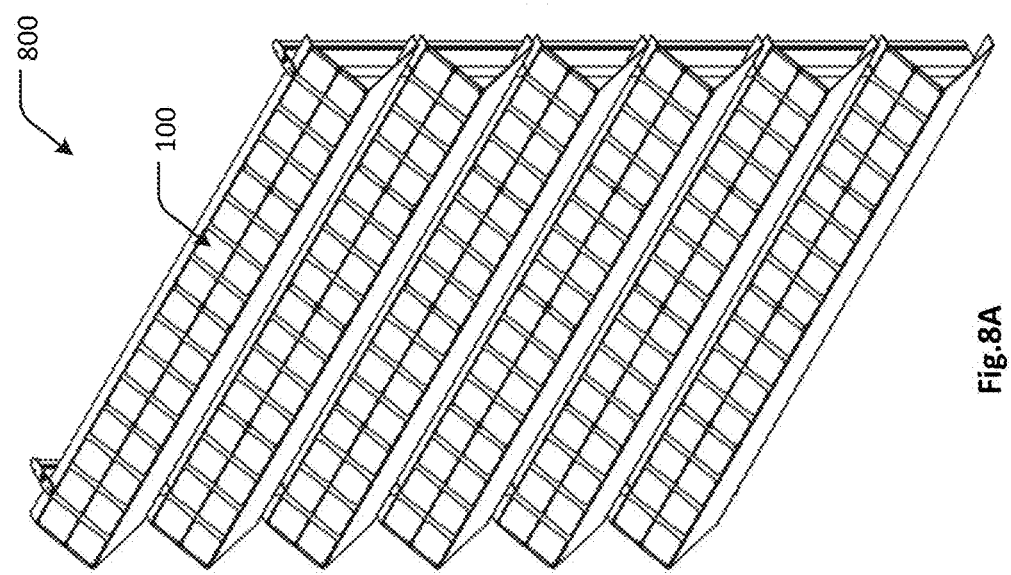

The components of the mounting system 700 are shown in an assembled configuration in FIG. 7B (in perspective) and in FIG. 7C (in side view). The channel 718 and locking tube 780 are shown in broken lines, hidden within the rail 710. A longitudinal cross-section B-B is shown in FIG. 7D (section indicated in FIG. 7C), illustrating the locking tube 780 disposed in the channel 718 and passing through the mounting aperture 138 in the flange 108 of the screening element 100. A lateral cross-section A-A is shown in FIGS. 7E and 7F (section indicated in FIG. 7C) illustrating the relative orientation of the mounting aperture 138, channel 718 and locking tube 780.

The locking tube 780 may comprise an elongate body of substantially similar length to the rail 710 with a constant cross-section. The locking tube 780 may also be formed as an extrusion, for example. The locking tube 780 may alternatively be referred to as a locking rod, or locking pin. In some embodiments, the locking tube 780 may be hollow and define an internal passage 783 configured to receive a tool and/or fasteners, such as screws.

In some embodiments, an outer surface of the locking tube 780 may define an elliptical cylinder, and the mounting aperture 138 of the screening element 100 may also be elliptical, while the locking tube channel 718 may be defined by a circular cylinder. The locking tube 780 may be sized to fit closely within the channel 718, but have a larger tolerance in the mounting aperture 138 to allow for some error in alignment between the mounting aperture 138 and channel 718 during placement.

A major (maximum) diameter of the locking tube 780 may be similar to or slightly less than a diameter of the channel 718, to allow insertion and rotation of the locking tube 780 within the channel 718.

A major diameter of the mounting aperture 138 may be larger than the diameter of the channel 718, to allow for small errors in lateral alignment during placement of the flange 108, 118 in the slot 728.

A minor (minimum) diameter of the mounting aperture 138 may be larger than a minor diameter of the locking tube 718 and the major diameter of the mounting aperture 138 may be larger than the major diameter of the locking tube 780, to allow some error in alignment during insertion of the locking tube 780 through the mounting aperture 138.

The minor diameter of the mounting aperture 138 may be similar to the diameter of the channel 718 and similar to (or slightly larger than) the major diameter of the locking tube 780.

Referring to FIG. 7E, during insertion of the locking tube 780 through the mounting aperture 138, the major diameter of the locking tube 780 may be rotationally aligned with the major diameter of the mounting aperture 138. The locking tube 780 may then be rotated 90°, to the position shown in FIG. 7F, with the major diameter of the locking tube 780 aligned with the minor diameter of the mounting aperture 138. During this rotation, if there is any small misalignment between the mounting aperture 138 and the channel 718, the engagement of the locking tube 780 with the edge of the mounting aperture 138 will bring the mounting aperture 138 substantially into alignment with the channel 718.

In some embodiments, the mounting system 700 may further comprise a reinforcing member 781, as shown in FIGS. 7F and 11G, for example.

The reinforcing member 781 may comprise an elongate rod or tube configured to be fully (or at least partially) received or accommodated within the internal passage 783 of the locking tube 780. This may increase the beam strength of the locking tube 780 and/or rail 710 in the assembled mounting system 700.

The reinforcing member 781 may be installed by sliding it into the internal passage 783 of the locking tube 780. This may be done before or after placement of the locking tube 780 within the channel 718 in the rail 710.

The reinforcing member 781 may have a length substantially similar to the length of the locking tube 780. The reinforcing member 781 may have a constant profile along its length. The reinforcing member 781 may have a profile configured to fit tightly within the internal passage 783 of the locking tube 780. The reinforcing member 781 may have a different profile to an internal profile of the internal passage 783. For example, the reinforcing member 781 may define a hollow rectangular or hollow square profile.

The reinforcing member 781 may be formed of a different material to that of the locking tube 780. The reinforcing member 781 may be formed of any suitable reinforcing material, such as metal, metal alloys, steel, structural steel, or stainless steel, for example.

A plurality of reinforcing members 781 may be installed across the screen assembly 800, each reinforcing member 781 being disposed within the internal passage 783 of each one of the locking tubes 780 in the mounting system 700.

In some embodiments, the mounting system 700 may further comprise a safety cable 782, as shown in FIGS. 7F and 11G, for example. The safety cable 782 may include similar features to the cable 152 described above. For example, the safety cable 782 may comprise steel wire, rope or cable. However, the safety cable 782 may not be installed under load bearing tension, and may only support the mounting system 700 and screen assembly 800 if there is a failure of the mounting system 700.

The safety cable 782 may be installed to couple the mounting system 700 to the structure or facade to which the screen assembly 800 is to be mounted, in order to provide a redundant support for the screen assembly 800.

The safety cable 782 may be threaded through the internal passage 783 of the locking tube 780 with an upper end fixed to the structure or facade, and a lower end either fixed to a lower end of the mounting system 700, or tied off or clamped to prevent passage through the internal passage 783.

A plurality of safety cables 782 may be installed across the screen assembly 800, each safety cable being disposed within the internal passage 783 of each one of corresponding locking tubes 780 in the mounting system 700.

In some embodiments, where the mounting system 700 includes reinforcing members 781, the safety cables 782 may be threaded through an internal channel within each of the reinforcing members 781.

The endcap 790 may then be fixed to the end of the rail 710 and the locking tube 780 to fix the position and orientation of the locking tube 780 within the channel 718 in the rail 710.

The end cap 790 may comprise a plate defining a plurality of fastener apertures 794 corresponding with screw flutes 714 defined in the rail 710 and screw flutes 784 defined in the locking tube 780. The end cap 790 may be held in place with screws passing through the fastener apertures 794 and threadedly engaging the screw flutes 714, 784.

In some embodiments, to mitigate against loose components rattling, an elastic material or coating may be added between certain components. For example, a silicone or elastomeric tape or spray may be applied to part of the flanges 108, 118 of the screening element 100 prior to insertion in the slots 728 of the rails 710. In other embodiments, a separate buffer material may be provided between the screening element 100 and the rail 710.

A screen assembly 800 may be formed by combining two or more rails 710 with a plurality of screen elements 100, the flanges 108, 118 of each screen element 100 being partially accommodated within corresponding lateral slots 728 of each of the rails 710 and locked in place with locking tubes 780 disposed in the channel 718 of each rail 780.

Figure 10:
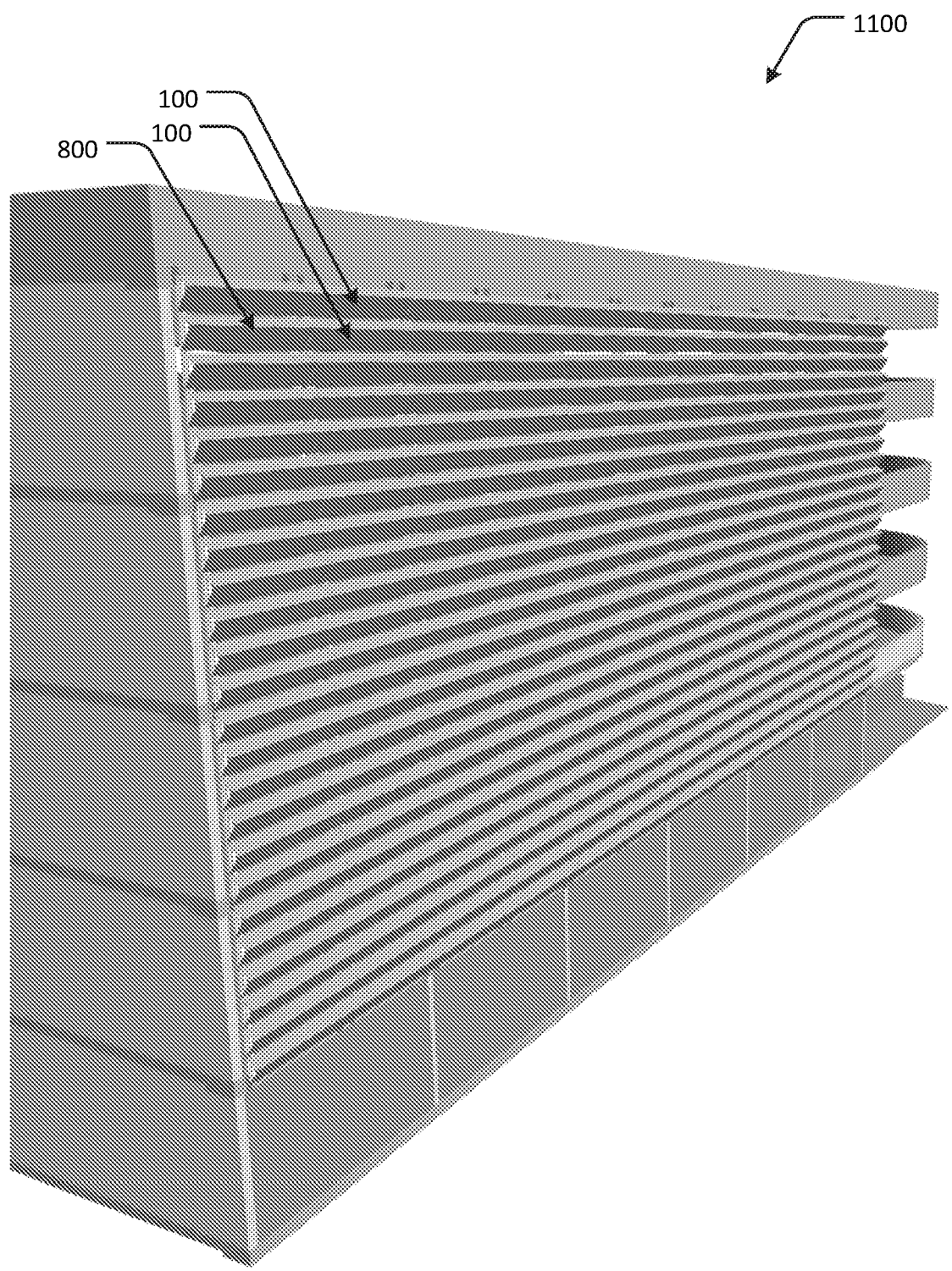
FIG. 10 is a perspective view of a building structure with a plurality of screen assemblies mounted thereto, according to some embodiments.

Referring to FIGS. 8A to 8C, a screen assembly 800 is shown according to some embodiments. The screen assembly 800 may be assembled and then mounted to a building structure 1000 as shown in FIG. 10.

The screen assembly 800 may comprise two rails 710 extending in parallel, and six screening elements 100 mounted on the rails 710 (in the slots 728). In some embodiments, the height of the screen assembly 800 (similar to the length of the rails 710) may be similar to a floor-to-floor height or storey height of the building structure 1000. This may be convenient for mounting the screen assembly to one or more floor structures of the building 1000, such as suspended slabs, for example.

The screen assembly 800 may be assembled by inserting the flanges 108, 118 of the screening elements 100 into the slots 728 of the rails 710; inserting the locking tubes 780 into the channels 718 of the rails 710 and through the mounting apertures of the screening elements 100; and rotating the locking tubes 780 to bring the mounting apertures 138 into alignment with the channels 718.

In some embodiments, a locking tube tool 1300 may be used to insert and/or rotate the locking tubes 780. The tool 1300 may comprise a lever handle 1310 (similar to a wrench) or a T-bar handle 1310, as shown in FIG. 13, and an elongate head 1380 defining a complimentary surface configured to engage an internal surface of the locking tube 780 and allow rotation of the locking tube 780 in the channel 718, as shown in FIG. 13.

Figure 9A:
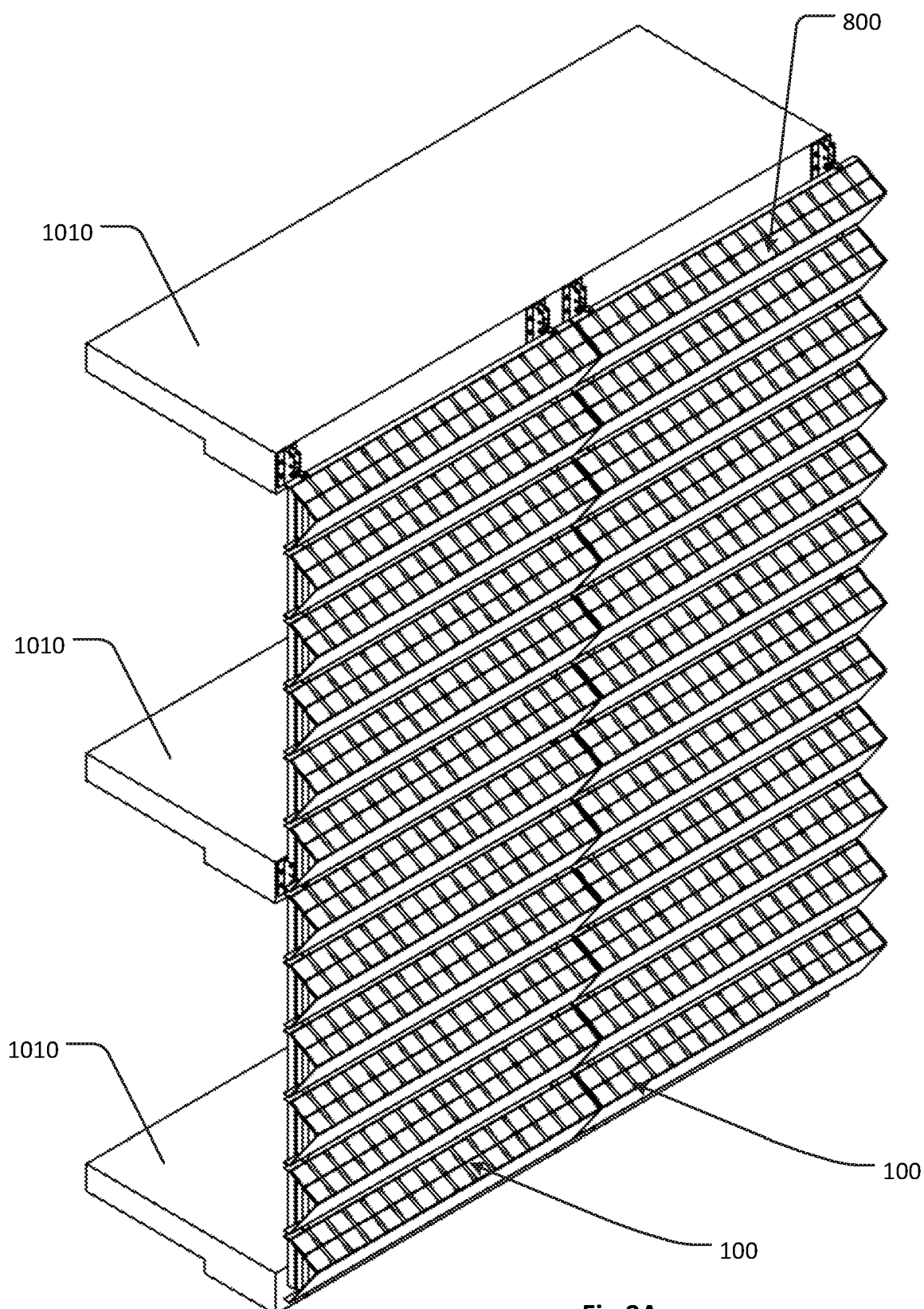
FIG. 9A is a perspective view showing multiple screen assemblies mounted to part of a building structure, according to some embodiments.
Figure 9C:
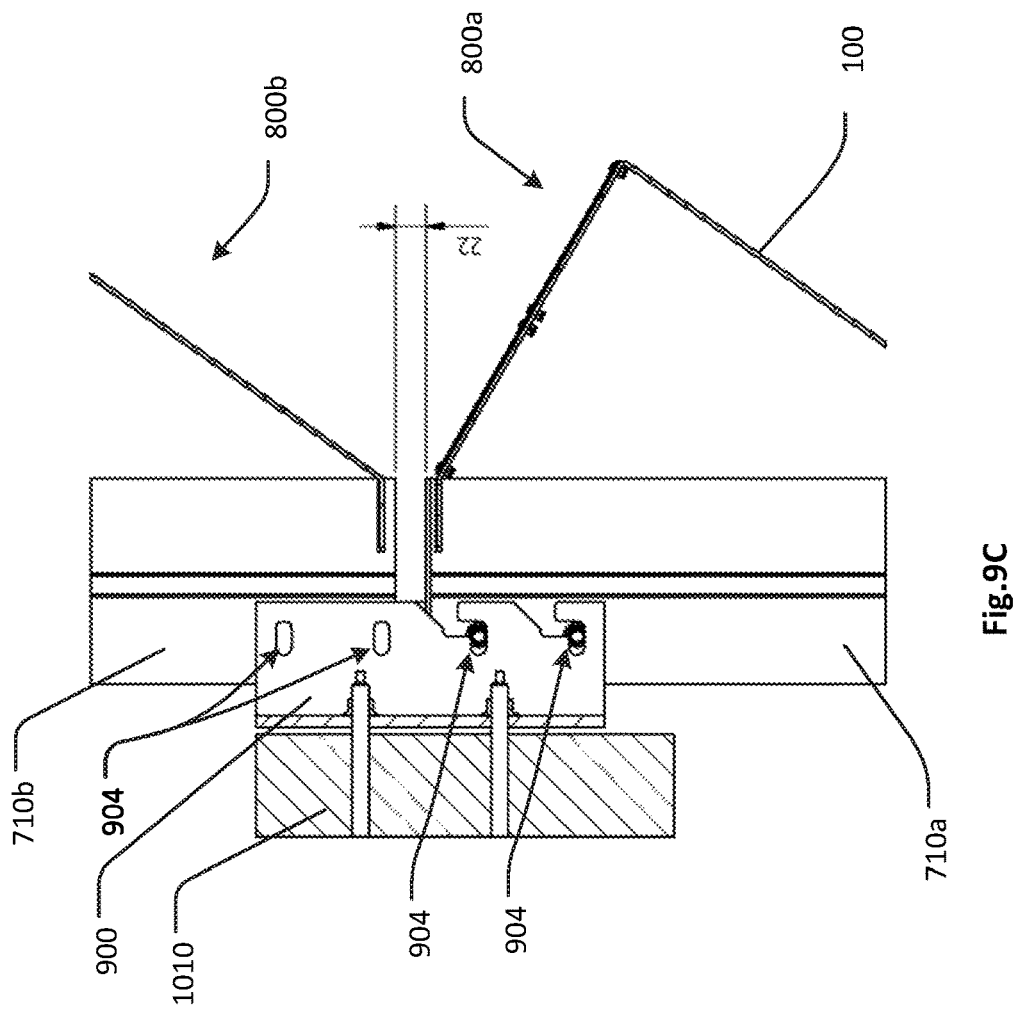
FIG. 9C is a side view and partial cross-section illustrating the mounting of the screen assembly to the bracket of FIG. 9B.
Figure 9B:
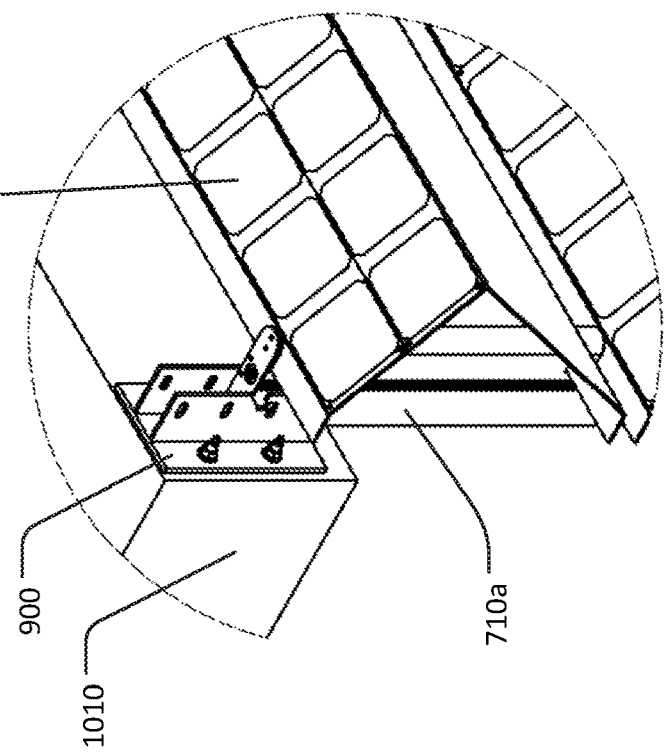
FIG. 9B is a close up perspective view of a bracket for mounting the screen assemblies of FIG. 9A to the building structure.

Referring to FIGS. 9A to 9C, a system for mounting the screen assembly 800 on a building structure 1000 is shown, according to some embodiments. FIG. 9A shows part of a building structure 1000, i.e., suspended floor structures 1010 (e.g., concrete slabs) of the building structure 1000, with a plurality of screen assemblies 800 mounted to the floors 1010. A close up and cross-section of the connection is shown in FIGS. 9B and 9C, respectively.

The rails 710 of the screen assembly 800 may be connected to the floor structures 1010 with brackets 900. Each bracket 900 may be fixed to the floor structure 1010 with mechanical fasteners (e.g., concrete bolts, expanding bolts, etc.) and provide a mounting point for the screen assembly 800.

Each bracket 900 may comprise two sets of fastener apertures 904, 914. A first set of apertures 904 to couple the top of a rail 710a of a lower screen assembly 800a to the bracket 900, and second set of apertures 914 to couple the bottom of a rail 710b of an upper screen assembly 800b to the bracket 900.

The first set of fastener apertures 904 may be open to an edge of the bracket 900 and each define a hook 906 configured to temporarily hold preconfigured bolts to support the screen assembly 800 before the bolts are tightened.

Each end of the rails 710 may include bolt holes and/or nutserts configured to receive bolts. In some embodiments, the nutserts may be positioned in tracks formed in the rail 710. Additionally or alternatively, a plate (not shown) may be provided in the track of the rail 710 to define the bolt holes and/or support the nutserts.

The bolts may be installed in the bolt holes and/or nutserts without fully tightening the bolts prior to mounting the screen assembly 800 on the building structure 1000. The screen assembly 800 may then be lifted into place, locating the protruding bolts in the fastener apertures 904 of the bracket 900. The hooks 906 may then hold the bolts in place in the bracket 900 until they can be tightened. This means that the screen assembly 800 may not need to be held in place manually while the bolts are tightened. Lower ends of each rail 710 of the screen assembly 800 may then be fixed to a lower one of the bracket 900 by inserting bolts into the fastener apertures 914 of the bracket and into the bolt holes and/or nutserts of the rail 710.

In this manner, multiple such screen assemblies 800 may be installed on the facade of a building structure 1000 as shown in FIG. 10. For example, the building structure 1000 may comprise a commercial building, factory, warehouse, office building, residential building, carpark or other structure.

In some embodiments, the screening elements 100 or screen assemblies 800 may comprise one or more actuators or mechanisms configured to adjust the angle or orientation of the solar panels 110 at different times of the day or year to optimise the exposure of the solar panels 110 to solar radiation.

For example, in some embodiments, top ends of the screen assemblies 800 (or rails 710) may be hingedly coupled to the building structure 1000 while the bottom ends may be coupled to an actuator configured to adjust a distance of the bottom end of the screen assembly from the building structure, thereby adjusting the angle of the screen assembly 800 (and rails 710) relative to the facade of the building structure 1000.

The elongate panel 101 can be made of a variety of materials, depending on aesthetics and physical requirements, including aluminium, mild steel, stainless steel, copper, brass, pure zinc, photo chromatic polycarbonate, for example. Colour choices of the panel are dependent on the material chosen and the aesthetics required. Panels 101 can be coated or chemically treated by anodising etc. or by surface treatments, such as paints or other coatings. For example, the panel 101 may be formed of a grade of aluminium selected from 5083 H116, 5083 H321, 5052 H32, 5251 H34, or 5005 H34 (Asian mills for powder coating or Bahrain mill for anodising)

The rails 710, and locking tubes 780 may be formed of any suitable material, including extrusion grade Aluminium, 6061 T6, 6061 T5, 6063 T6 or 6063 T5. Other components may be formed of suitable materials, such as metal, metal alloys, steel, structural steel or tensile steel, for example.

Figure 11D:
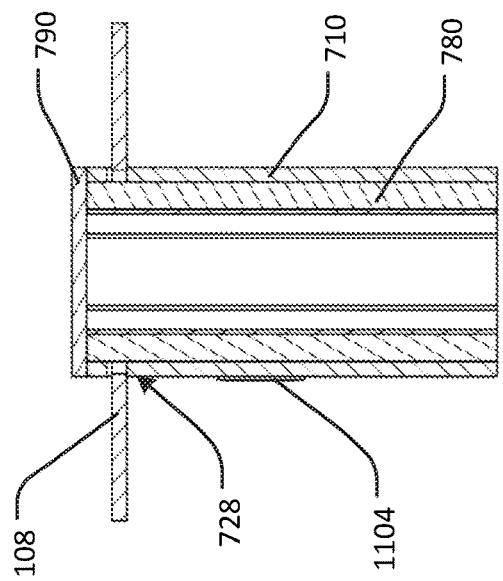
FIG. 11D is a cross-section of the mounting system of FIG. 11A as indicated in FIG. 11C as section B-B.

Referring to FIGS. 11A to 11Q, a mounting system 1100 is illustrated according to some embodiments. The mounting system 1100 is similar to mounting system 700 in many regards and also includes some further features. Like features are indicated with like reference numerals, and the mounting system 1100 may include any of the features described above in relation to mounting system 700. FIGS. 11A to 11G show an upper end of the rail 710 and associated components, while FIGS. 11H to 11Q show a lower end of the rail 710 and associated components.

In some embodiments, the locking tube 780 may define insert channels 786 configured to receive inserts or gripping inserts 788. The gripping inserts 788 may be formed of a softer material than the locking tube 780, such as rubber, silicone, PVC, or another polymer, for example, to assist in gripping the panel 101 of the screening element 100 and/or the inner surface of the rail channel 718.

The insert channels 786 may extend longitudinally along substantially the entire length of the locking tube 780, on opposing sides of the locking tube 780 aligned with the major axis of the elliptical profile of the locking tube 780, as shown in FIGS. 11F and 11G. The gripping inserts 788 may each define a T-shaped cross-sectional profile configured to be received in a corresponding complementary T-shaped profile of each insert channel 786. A ridge 789 of each insert 788 may be configured to protrude slightly from a side surface of the locking tube 780 when installed in the insert channels 786, as shown in FIGS. 11F and 11G.

When the locking tube 780 is inserted in the rail channel 718, the ridges 789 of the gripping inserts 788 may abut an internal surface of the rail channel 718. When the locking tube 780 is rotated within the mounting apertures 138 of the flanges 108, 118 of the screening elements 100, the ridges 789 may abut an edge of each flange 108, 118 defining the mounting apertures 138 to lock the screening elements 100 in place within the slots 728 of the rail 710.

In some embodiments, a maximum diameter between the ridges 789 (measured perpendicular to the ridges 789) may be slightly greater than the minor diameter of the mounting apertures 138. In some embodiments, the ridges 789 of the gripping inserts 788 may be deformed on engagement with the flanges 108, 118. For example, the edge of each flange 108, 118 defining the mounting apertures 138 may cut into the ridges 789 of the gripping inserts 788. This may enhance the engagement between and gripping of the flanges 108, 118 by the gripping inserts 788.

Figure 11C:
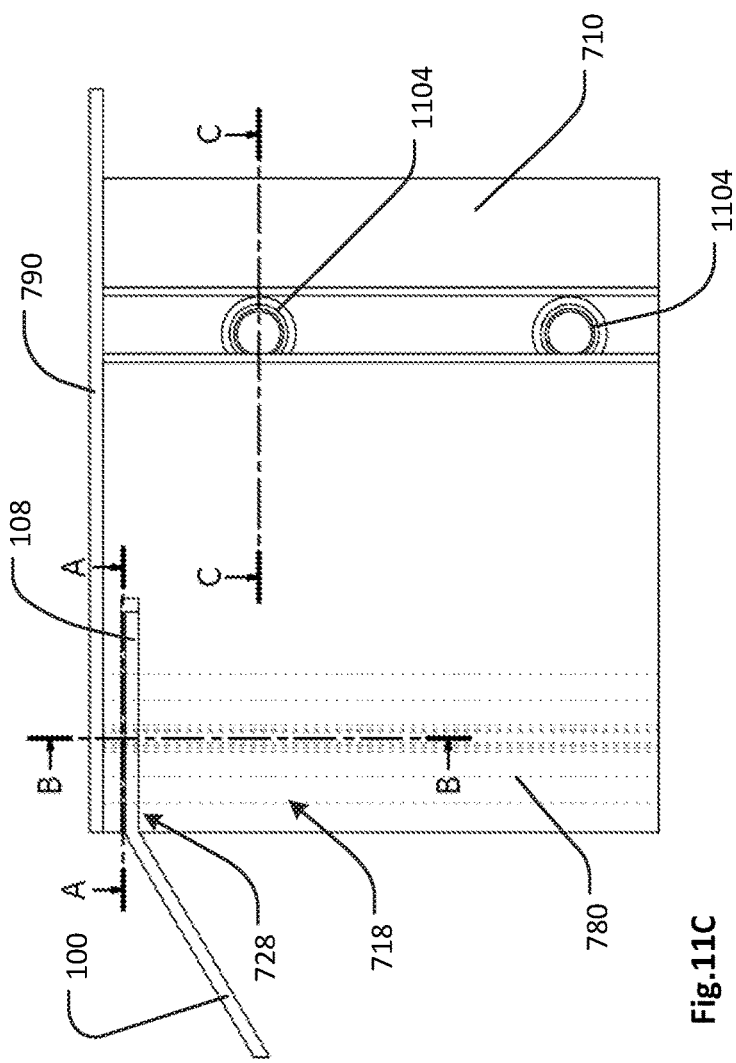
FIG. 11C is a side view of the mounting system of FIG. 11A.
Figure 11E:
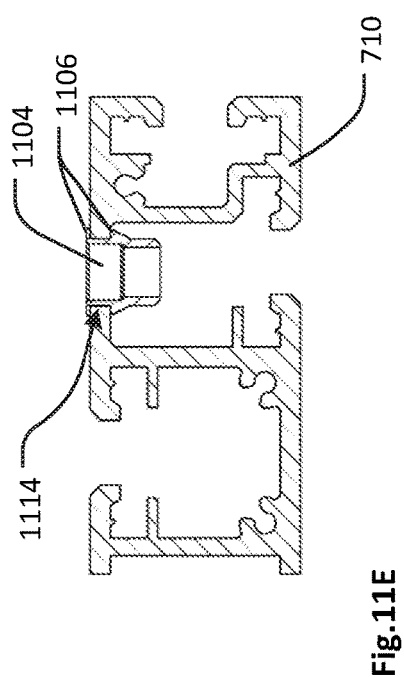
FIG. 11E is a cross-section of the mounting system of FIG. 11A as indicated in FIG. 11C as section C-C.
Figure 11H:
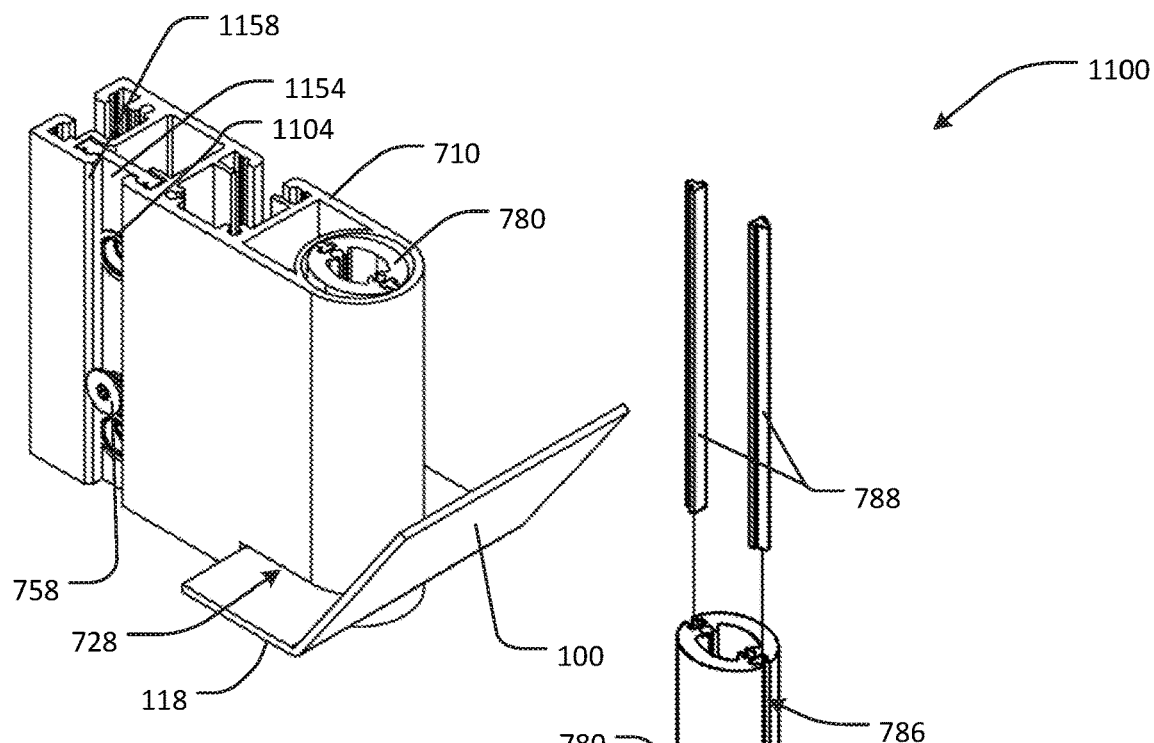
FIG. 11H is a perspective view of a lower end of the mounting system of FIG. 11A, according to some embodiments, in an assembled configuration.
Figure 11J:
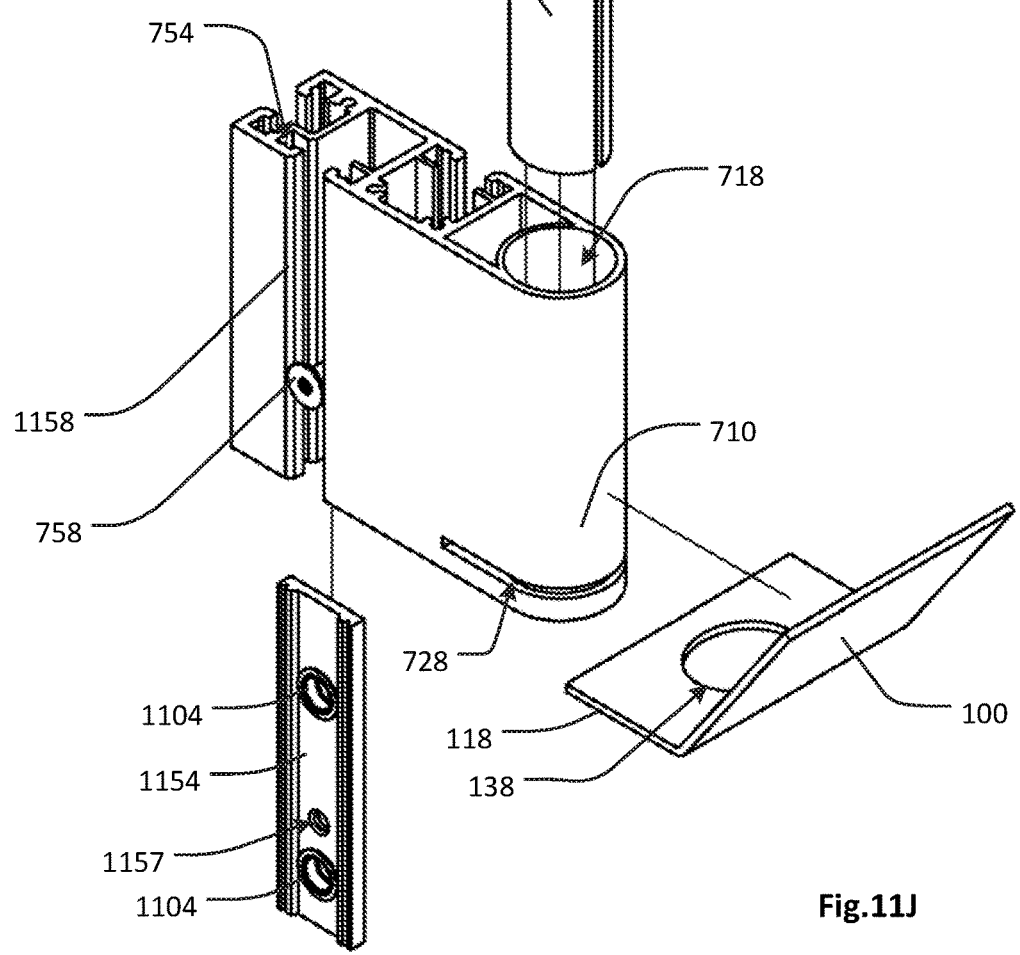
FIG. 11J is a perspective view of a lower end of the mounting system of FIG. 11A in an disassembled configuration.

FIG. 11C illustrates the mounting system 1100 and upper end of the rail 710 shown in side view, indicating section line A-A (section shown in FIGS. 11F and 11G), section line B-B (section shown in FIG. 11D) and section line C-C (section shown in FIG. 11E.

The upper end of the rail 710 may be mounted on a bracket 900 to a structure 1000 as described above in relation to mounting system 700 and FIGS. 9A to 9C.

Referring to FIGS. 11B to 11E, in some embodiments, the mounting system 1100 may include nut inserts or nutserts 1104 configured to receive screws or bolts to mount the rail 710 on the bracket 900.

The nutserts 1104 may be installed in apertures 1114 defined in the rail 710, such as a side of the rail 710, for example. Each nutsert 1104 may define two opposing flanges 1106 configured to extend over an edge defining the aperture 1114 on either side of the aperture 1114 to hold the nustert 1104 in place, as shown in FIG. 11E.

The nutserts 1104 may be installed in the apertures 1114 using a tool, such as a Hydro Pneumatic Spin-Pull Nut Insert Installation Tool, or Profast TA-KJ60, for example. The tool may be used to insert each nutsert 1104 into the corresponding aperture 1114 and swage one of the flanges 1106 to hold the nutsert 1104 in place in the aperture 1114.

In some embodiments, bolts may be pre-installed in the nutserts 1104 before hanging the rails 710 or screen assembly 800 on hooks 906 of the brackets 900 as described above in relation to mounting system 700 and brackets 900. Lower ends of the rails 710 may also be fixed to the brackets 900 with nuts or nutserts and bolts as described above in relation to mounting system 700.

In some embodiments, the lower ends of the rails 710 may be mounted to the brackets 900 with some allowance for movement in the connection. For example, to allow for dimensional variability due to expansion/contraction of the rails 710 under different temperature conditions, or to allow for dimensional variability due to dynamic loads in the structure 100o to which the rails 710 are mounted.

Referring to FIGS. 11H to 11Q, the lower end of the rail 710 is shown illustrating the mounting system 1100 according to some embodiments. The lower flange 118 of one of the screening element 100 is shown as it is inserted in the lateral slot 728 and locked into place with the locking tube 780 at the lower end of the rail 710.

In order to allow for vertical movement in the connection between the rail 710 and the bracket 900—i.e., relative movement between the rail 710 and bracket along a length direction of the rail 710—the mounting system 1100 may comprise a slide nut, sliding nut, or slide nut plate 1154 to connect the lower end of the rail 710 to the bracket 900.

The slide nut plate 1154 is configured to be received in a track 754 of the rail 710. In some embodiments, the rail 710 may define two or more such tracks 754 configured to receive the slide nut plate 1154.

The slide nut plate 1154 may define one or more apertures 1155 configured to receive nutserts 1104 as described above in relation to apertures 1104 in the rail 710. The lower end of the rail 710 may be mounted on a bracket 900 by inserting screws or bolts through fastener apertures 904 in the bracket 900 and into the nutserts 1104 in the slide nut plate 1154. This may restrict movement of the rail 710 in lateral or horizontal directions relative to the bracket 900, while allowing some longitudinal or vertical movement of the lower end of the rail 710 relative to the bracket 900 with the slide nut plate 1154 being able to slide along the track 754 in the rail 710.

In some embodiments, the track 754 and slide nut plate 1154 may define complimentary mating surfaces to increase the contact surface area (and friction) between the track 754 and slide nut plate 1154. For example, the slide nut plate 1154 may define one or more slide nut channels 1156 configured to receive complimentary track ridges 756 of the track 754, as shown respectively in FIG. 11M (which shows a cross-section of the rail 710 and track 754, as indicated by section line A-A in FIG. 11K) and FIG. 11P (which shows an end view of the slide nut plate 1154).

In some embodiments, the slide nut plate 1154 may define an aperture 1157 and comprise a friction adjustment screw 1158 disposed in the aperture 157 and threadedly engaged with the slide nut plate 1154, configured to adjust the friction between the slide nut plate 1154 and the rail 710. For example, the friction adjustment screw 1158 may define a countersunk head configured to engage chamfered edges 758 of the rail 710 adjacent the track 754. The friction adjustment screw 1158 may be configured to clamp the chamfered edges 758 of the rail 710 between the head of the screw and the slide nut plate 1154 in the track 754. The friction between the slide nut plate 1154 and the rail 710 may be increased by tightening the friction adjustment screw 1158 to increase the reaction forces between the slide nut plate 1154 and an internal surface of the track 754 (or between the track channels 756 and complimentary ridges 1156 of the slide nut plate 1154, for example).

In this way, the friction between the slide nut plate 1154 and track 754 or rail 710 may be adjusted to suit a given application to allow for some vertical or longitudinal movement of the lower end of the rails 710 of a screen assembly 800 relative to the brackets 900 (and structure 1000), while maintaining sufficient friction to hold the slide nut plate 1154 in the track 754 during installation and mounting of the screen assembly 800 on the structure 1000.

In some embodiments, the elongate panel 101 may be formed of a single piece of a single material. In other embodiments, the panel 101 may be formed of a plurality of pieces of the single material. In another embodiment, the panel 101 may be formed of a plurality of pieces formed of a plurality of materials, where some pieces are formed from a first material and other pieces are formed from a second material, for example.

Referring now to FIG. 12, an example of a manufacturing method 1200 for producing the elongate panel 101 is disclosed. At 1210, a sheet of the first material is formed into the required size of the elongate panel. At 1220, apertures are made in the elongate panel, for example by a press, stamp, or laser cutting, before the panel 101 is shaped (for example, by bending the sheet). At 1230, the elongate panel is chemically treated to prepare it for the application of a paint or coating, wherein the paint or coating may serve a protective and/or cosmetic function. At 1240, the solar panel 110, together with ancillary devices, such as a controller or battery, are attached and/or electrically connected to the elongate panel.

In embodiments of the elongate panel 101 substantially comprising a metal or metal alloy, the panel 101 may be formed by mechanically or hydraulically deforming a sheet of metal or metal alloy, for example. Equipment such as a press brake or hydroforming apparatus may be used for forming such embodiments of elongate panel 101. The array of apertures 130 may be machined into the sheet of metal or metal alloy in a predetermined aperture configuration. The array of apertures 130 may be formed by a press, a stamp, or by laser cutting, for example. Preferably, the array of apertures 130 is formed in the sheet prior to bending the sheet so that the first portion 102 and the second portion 112 are angled relative to each other.

The elongate panel 101 may be treated to provide various functional and/or cosmetic features. For example, in embodiments where the elongate panel is formed from a metal or metal alloy, the elongate panel may be subjected to a chemical treatment to remove surface impurities or discolouration, improve corrosion resistance, or to prepare the metal surface for painting or other forms of coating. In some embodiments, painting or other forms of coating may be applied to the surface of the panel, metal or otherwise, for cosmetic or aesthetic purposes, and/or to provide some degree of protection from elements such as UV light, animals, rain, oxidisation, airborne debris, or impact.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A screen assembly comprising:
a plurality of screen elements, each screen element defining an elongate panel defining a first portion and a second portion angled relative to the first portion, and defining two or more mounting flanges, including a first mounting flange extending from an edge of the first portion and a second mounting flange extending from an edge of the second portion, each mounting flange defining two or more mounting apertures and each mounting flange being substantially similar to the other mounting flanges, wherein at least one of the plurality of screen elements comprises at least one solar panel connected to the first portion of the elongate panel;
a plurality of rails, corresponding to the number of mounting apertures defined by each mounting flange, each rail defining a longitudinal channel and a plurality of lateral slots, each slot accommodating part of one of the mounting flanges of the screening elements; and
a plurality of locking pins, each locking pin being accommodated in the channel of one of the rails and extending through the mounting apertures of the mounting flanges accommodated in the slots.

2. The screen assembly of claim 1, wherein the second portion includes a solid portion that defines an array of apertures.

3. The screen assembly of claim 2, wherein an open area defined by the array of apertures accounts for at least 30% of a total area of the second portion including the solid portion and open area.

4. The screen assembly of claim 1, wherein an angle of the screening element defined between a first direction normal to the first portion and a second direction normal to the second portion, is between 60° and 160°.

5. The screen assembly of claim 1, wherein the at least one solar panel covers substantially the entirety of an upper face of the first portion.

6. The screen assembly of claim 1, wherein the at least one solar panel covers between about 50% and about 95% of an upper face of the first portion.

7. The screen assembly of claim 1, wherein the first and second mounting flanges of each screening element are configured to be substantially parallel to each other when mounted in the lateral slots of the rails.

8. The screen assembly of claim 1, wherein the mounting flanges extend substantially the entire length of the elongate panel.

9. The screen assembly of claim 1, further comprising a slide nut plate configured to be received in a track defined by the rail, and configured to be mechanically fastened to a structure to mount the rail to the structure while allowing longitudinal movement of the rail relative to the structure by allowing the slide nut plate to slide along the track.

10. The screen assembly of claim 9, wherein the track and slide nut plate define complimentary mating surfaces to increase the contact surface area between the track and the slide nut plate.

11. The screen assembly of claim 10, wherein the slide nut plate defines one or more slide nut channels configured to receive complimentary track ridges of the track.

12. The screen assembly of claim 9, wherein the slide nut plate defines an aperture and comprises a friction adjustment screw disposed in the aperture and threadedly engaged with the slide nut plate, wherein the friction adjustment screw is configured to adjust the friction between the slide nut plate and the rail.

13. A screen assembly kit comprising a plurality of ones of the screening element and a plurality of ones of the mounting system of claim 1.

14. The screen assembly kit of claim 13, wherein the second portion includes a solid portion that defines an array of apertures.

15. The screen assembly kit of claim 13, wherein an angle of the screening element defined between a first direction normal to the first portion and a second direction normal to the second portion, is between 60° and 160°.

16. The screen assembly kit of claim 13, wherein the at least one solar panel covers substantially the entirety of an upper face of the first portion, or wherein the at least one solar panel covers between about 50% and about 95% of an upper face of the first portion.

17. The screen assembly kit of claim 13, wherein the first and second mounting flanges of each screening element are configured to be substantially parallel to each other when mounted in the lateral slots of the rails, and wherein the mounting flanges extend substantially the entire length of the elongate panel.

18. The screen assembly kit of claim 13, further comprising a slide nut plate configured to be received in a track defined by the rail, and configured to be mechanically fastened to a structure to mount the rail to the structure while allowing longitudinal movement of the rail relative to the structure by allowing the slide nut plate to slide along the track.

19. The screen assembly kit of claim 13, wherein the slide nut plate defines one or more slide nut channels configured to receive complimentary track ridges of the track.

20. The screen assembly kit of claim 13, wherein the slide nut plate defines an aperture and comprises a friction adjustment screw disposed in the aperture and threadedly engaged with the slide nut plate, wherein the friction adjustment screw is configured to adjust the friction between the slide nut plate and the rail.

* * * * *